(12) United States Patent
Abe

(10) Patent No.: US 8,850,551 B2
(45) Date of Patent: Sep. 30, 2014

(54) INFORMATION PROCESSING SYSTEM CONTROL METHOD, INTERMEDIATE SERVICE DEVICE, AUTHENTICATION METHOD, AND STORAGE MEDIUM

(71) Applicant: Canon Kabushiki Kaisha, Tokyo (JP)

(72) Inventor: Koichi Abe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/661,152

(22) Filed: Oct. 26, 2012

(65) Prior Publication Data

US 2013/0179961 A1 Jul. 11, 2013

(30) Foreign Application Priority Data

Dec. 1, 2011 (JP) ................................. 2011-263571

(51) Int. Cl.
*G06F 21/00* (2013.01)
*G06F 21/44* (2013.01)
*G06F 21/60* (2013.01)

(52) U.S. Cl.
CPC .............. *G06F 21/44* (2013.01); *G06F 21/608* (2013.01)
USPC ...... 726/9; 726/5; 726/28; 713/172; 713/185; 358/1.15

(58) Field of Classification Search
USPC .......................................................... 726/9
See application file for complete search history.

(56) References Cited

U.S. PATENT DOCUMENTS

| | | | |
|---|---|---|---|
| 2008/0266403 A1* | 10/2008 | Hsu et al. .................... | 348/207.2 |
| 2010/0023980 A1* | 1/2010 | Yamagishi et al. ........... | 725/104 |
| 2010/0330957 A1* | 12/2010 | Harada et al. ................. | 455/406 |
| 2011/0289508 A1* | 11/2011 | Fell et al. ....................... | 718/105 |
| 2012/0023377 A1* | 1/2012 | Garskof .......................... | 714/48 |
| 2012/0099146 A1* | 4/2012 | Stokes et al. ................. | 358/1.15 |
| 2013/0085968 A1* | 4/2013 | Schultz et al. ................ | 705/400 |
| 2013/0155464 A1* | 6/2013 | Bearchell ..................... | 358/1.15 |

FOREIGN PATENT DOCUMENTS

JP 2005-100340 A 4/2005

OTHER PUBLICATIONS

Bansal et al., "An Analysis of Cloud Computing", Nov. 2011, 10 pages.*
Introduction of Cloud Print, http://code.google.com/apis/cloudprint/docs/overview.html.

* cited by examiner

*Primary Examiner* — Jason Lee
*Assistant Examiner* — Thaddeus Plecha
(74) *Attorney, Agent, or Firm* — Carter, DeLuca, Farrell & Schmidt, LLP

(57) ABSTRACT

Provided is a method for controlling an information processing system including a relay service device, an intermediate service device, and an authentication service device. The control method includes transmitting an authentication request from the intermediate service device to the intermediate service device; acquiring a first access token from the authentication service device that has made a success of authentication; storing the first access token; comparing the stored first access token with a second access token included in an execution request of an relation processing upon reception of the processing execution request from the relay service; and executing processing received from the intermediate service device when it is determined in the comparing that the first access token matches the second access token or not executing the processing when it is determined in the comparing that the first access token does not match the second access token.

5 Claims, 15 Drawing Sheets

↔ REPRESENTS ADDRESS DATA BUS

INFORMATION PROCESSING SYSTEM CONTROL METHOD, INTERMEDIATE SERVICE DEVICE, AUTHENTICATION METHOD, AND STORAGE MEDIUM

BACKGROUND OF THE INVENTION

1. Field of the Invention

The present invention relates to a method for controlling an information processing system, an intermediate service device, an authentication method, and a storage medium.

2. Description of the Related Art

In recent years, a peripheral device control system in which peripheral devices are connected to information processing apparatuses using various types of interfaces such as USB, Ethernet (registered trademark), wireless LAN, and the like is effectively used in various locations such as homes, offices, and the like. Examples of such a peripheral device include a printer, a copier, a facsimile, a scanner, a digital camera, a multi-function peripheral thereof, and the like.

As an example of such a peripheral device control system that supports printers or multi-function peripherals from among the peripheral devices, a cloud print service called Google Cloud Print (hereinafter abbreviated as "GCP" (registered trademark)) is provided by Google, Inc. By using a cloud print service, a user can activate (utilize) a document-creating application or the like from a personal computer (hereinafter referred to as "PC") or a mobile device, and print a document on a printer or a multi-function peripheral via Internet. The procedure of printing using GCP is as follows.

(1) A user performs an operation for opening a document using a document-creating application installed on a PC.

(2) In order to print the document on a printer, the user selects the printer by opening a print dialogue and performs an operation for executing printing.

(3) The document-creating application generates a print image as a PDF file.

(4) GCP generates a print job from a print setting value selected by the print dialogue and the PDF file, stores the print job in a print queue assigned to the printer in GCP, and transmits a print job notification to the printer.

(5) Upon receiving the print job notification, the printer acquires the print job, and prints the print image of the PDF file in accordance with the print setting value.

For example, when a printer or a multi-function peripheral is capable of rendering a PDF file, the printer or the multi-function peripheral can perform printing in accordance with the procedure using GCP. However, when an inexpensive printer or an inexpensive multi-function peripheral is incapable of rendering a PDF file, the inexpensive printer or the inexpensive multi-function peripheral cannot print the print image of the PDF file in (5).

In order to perform printing on such an inexpensive printer or an inexpensive multi-function peripheral using GCP, there is an application for a Web service (image conversion service). An image conversion service application converts a PDF file into an image format such as a JPEG file or the like which can be printed by an inexpensive printer or an inexpensive multi-function peripheral. Also, there has been proposed an information processing system in which a PDF file is converted into a JPEG file using the image conversion service application and the JPEG file is printed by an inexpensive printer or an inexpensive multi-function peripheral.

Japanese Patent Laid-Open No. 2005-100340 discloses another technique for providing a Web service for printing. In the print service disclosed in Japanese Patent Laid-Open No. 2005-100340, printing is realized by a printer located at any location using the following method. Such printing is realized by a method for exchanging information about a print reservation, data, and a printable application among print environment in shared services deployed in various locations and presenting a printable print location to a user. With the aid of the print service disclosed in Japanese Patent Laid-Open No. 2005-100340, a user can print on a printer which is located at any remote location.

In the aforementioned peripheral device control system using GCP, a plurality of printers is managed and a Web service for providing a cloud print proxy service for adaptation to GCP (e.g., a Web application for a proxy service) is required.

In the peripheral device control system, a proxy service application processes a print job in cooperation with an image conversion service application. In other words, the image conversion service application converts a PDF file included in a print job issued by GCP into a JPEG file. In this manner, the user can print using an inexpensive printer or an inexpensive multi-function peripheral.

In an information processing system represented by such a peripheral device control system, for example, the Web service applications may be present in a local area network without passing through the Internet. The HTTP POST method or GET method instead of HTTPS may be utilized for communication between the Web application services. In such a case, when a Web service API provided by each of the Web service applications is used between the Web service applications, the frequent communication may occur, resulting in an increase in the traffic on a network. Consequently, the time required for communication between services impacts on the processing times for the entire system. In addition, an excessive load is placed on a specified Web application that receives a call of a Web service API.

SUMMARY OF THE INVENTION

The method for controlling an information processing system of the present invention provides a structure that decreases a load on a specified Web service application by suppressing the communication frequency and the quantity of data communication between the Web service application devices.

According to an aspect of the present invention, a method for controlling an information processing system is provided, wherein the information processing system comprises a relay service device that performs relay processing related to a service provided from a provision device to a user via a network, an intermediate service device that communicates with the relay service device and performs relation processing related to the service, and an authentication service device that receives an authentication request from the intermediate service device. The method comprises transmitting, by the relay service device, an authentication request or an execution request of the relation processing to the intermediate service device; transmitting, by the intermediate service device, the authentication request from the relay service device to the authentication service device; acquiring, by the intermediate service device, a first access token from the authentication service device that has made a success of authentication; storing, by the intermediate service device, the first access token; comparing, by the intermediate service device, the stored first access token with a second access token included in the execution request of the relation processing upon reception of the processing execution request; and executing, by the intermediate service device, the relation processing when it is determined in the compering that the first access token matches the second access token or not executing the relation processing when it is determined in the compering that the first access token does not match the second access token.

Further features of the present invention will become apparent from the following description of exemplary embodiments with reference to the attached drawings.

DESCRIPTION OF THE EMBODIMENTS

Figure 1:
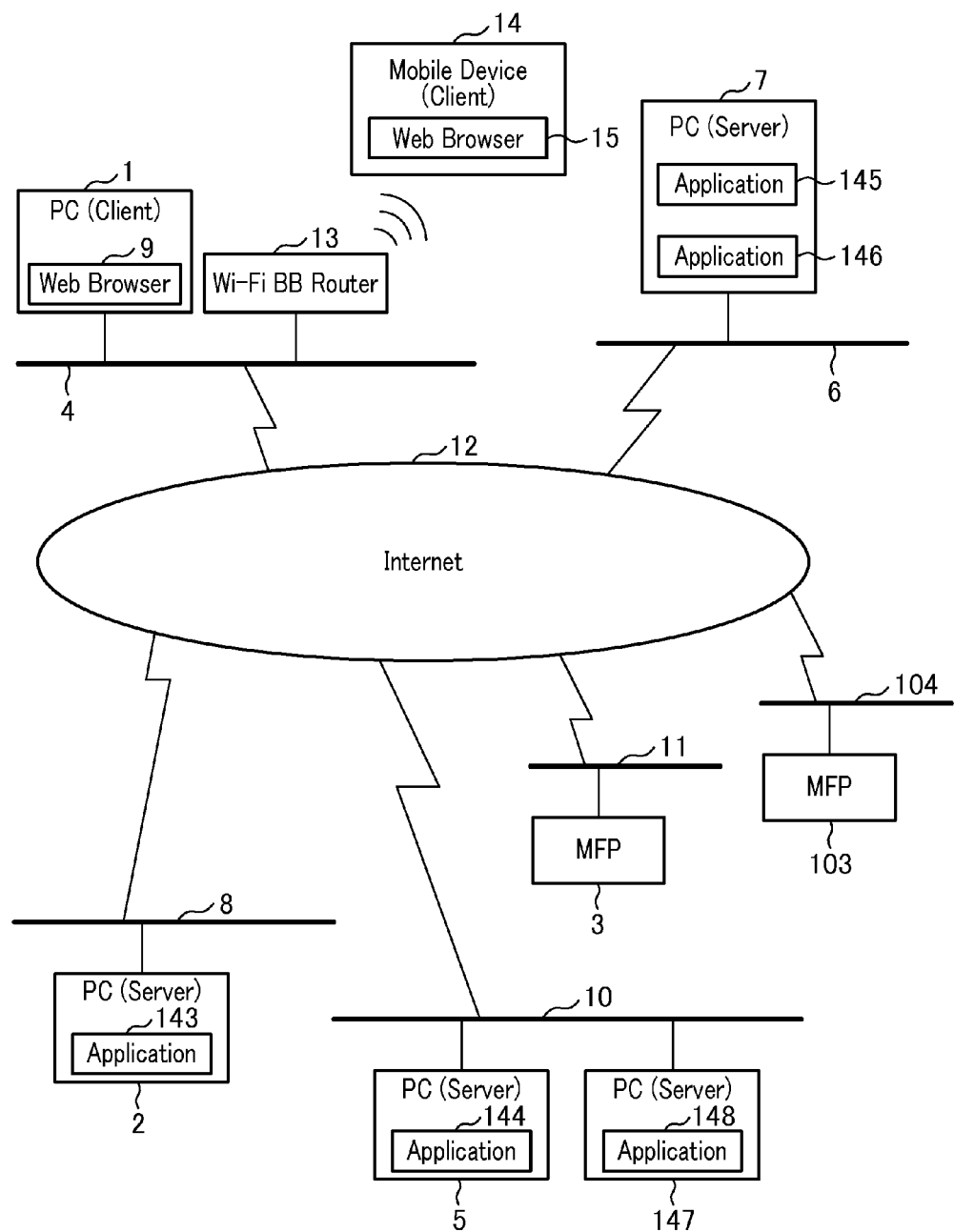
FIG. 1 is a diagram illustrating an example of the configuration of an information processing system.

An information processing system that manages a plurality of printers and provides a print service desired by a user using GCP is contemplated. The information processing system needs to include a proxy application that performs relay processing relating to a service provided by GCP. In the information processing system, a proxy service application processes a print job in cooperation with an image conversion service application. The image conversion service application converts a PDF file included in a print job issued by GCP into a JPEG file. In this manner, print data can be printed by an inexpensive printer or an inexpensive multi-function peripheral.

In such an information processing system, it is contemplated that security is ensured by an authentication system utilizing authentication service application when the proxy service application uses the image conversion service application. For example, the proxy service application assigns a user ID and a password for authenticating the user ID to each printer managed by itself. Then, the authentication service application performs user authentication based on the user ID and the password, and issues an access token for utilization of the image conversion service application to the user ID (printer).

The proxy service application accesses the image conversion service application using the access token. Also, the image conversion service application can convert a PDF file, which is included in a print job for a printer to which the user ID is assigned, into a JPEG file, and thus the printer can print the JPEG file.

In general, the image conversion service application is exporting a plurality of Web service APIs to the proxy service application. The proxy service application sequentially calls the Web service APIs being exported by the image conversion service application. The image conversion service application executes the processing operations of Web service APIs sequentially called by the proxy service application. The image conversion service application converts a PDF file included in a print job into a JPEG file during the processing, and deletes an unnecessary JPEG file (print image) after completion of printing by the printer.

When the proxy service application sequentially calls the Web service APIs being exported by the image conversion service application, the proxy service application inquires the validity and the expiration date/time of the access token at each time. In other words, the proxy service application calls an access token validity confirmation API and an access token expiration date/time confirmation API from among the Web service APIs being exported by the authentication service application.

An interface between the services and an interface between the services and an inexpensive printer or an inexpensive multi-function peripheral are defined by the Web service API, and usually utilizes the SSL-encrypted HTTPS POST method or GET method. The encrypted communication ensures security.

In this case, when the Web service APIs are used, a very long time is required for the encryption of information upon transmission thereof or for the decryption of information upon reception thereof. Also, the load on communication processing increases, which makes it difficult to build a system or implement an application when a cloud is used.

Each Web service application and an inexpensive printer or an inexpensive multi-function peripheral access authentication service application at every processing each time to thereby inquire the validity or expiration date/time of an access token. However, when an access token validity confirmation API or an access token expiration date/time confirmation API is called to inquire the validity or the expiration date/time of the access token, the load on authentication service application increases, resulting in a reduction in performance or exceeding the available amount for authentication service application. In order to avoid such influences, the scale of the system for the authentication service application needs to be increased. In this case, the system configuration for the authentication service application is complicated, resulting in an increase in operational costs.

Furthermore, an information processing system in which each of the Web service applications inquires authentication service application for the validity or the expiration date/time of an access token and verifies it is contemplated. However, in such an information processing system, an access token may be mistakenly determined to be valid in situations where an upstream Web service application malfunctions. If it is determined that the access token is valid, irrelevant processing or an irrelevant job (e.g., a print job for another person) may be incorrectly processed. In such a case, the Web service application of interest may be maliciously attacked by access from a spoofing program spoofing, for example, an upstream service. Consequently, the Web service application may malfunction or information may be leaked out.

According to the information processing system of the present embodiment to be described below, the foregoing possibilities can be resolved. In other words, according to the information processing system of the present embodiment, a load on a specified Web service application can be decreased by suppressing the communication frequency and the quantity of data communication between the Web service application devices. Also, according to the information processing system of the present embodiment, a malfunction and information leakage can also be prevented even when a malicious attack such as spoofing access is made.

Hereinafter, a description will be given of the present embodiment with reference to drawings. The present embodiment is not intended to limit the present invention, but all of the configurations described in the embodiment are not necessarily the components.

In the following, although there is a case in which an SSL-encrypted HTTPS POST method (an exemplary communication scheme) is used for a Web service API, the POST method is general public information, and thus, the detailed description thereof will be omitted. Also, although there is a case in which an HTTPS GET method (an exemplary communication scheme) is used for a Web service API, the GET method is general public information, and thus, the detailed description thereof will be omitted. Also, although there is a case in which an SSL-encrypted HTTPS GET method (an exemplary communication scheme) is used for a Web service API, the GET method is general public information, and thus, the detailed description thereof will be omitted.

HTTP is an abbreviation for Hyper Text Transfer Protocol and is a known unencrypted communication protocol, and thus, the detailed description thereof will be omitted. HTTPS is an abbreviation for Hyper Text Transfer Protocol over Secure Socket Layer and is a known encrypted communication protocol, and thus, the detailed description thereof will be omitted. SSL is an abbreviation for Secure Socket Layer and is a known method for encrypting and transmitting/receiving data on the Internet, and thus, the detailed description thereof will be omitted. Since the description relating to GCP (Google Cloud Print) is disclosed in the following site, the detailed description thereof will be omitted. Internet URL: http://code.google.com/apis/cloudprint/docs/overview.html FIG. 1 is a diagram illustrating an example of the configuration of an information processing system of the present embodiment. The information processing system shown in FIG. 1 includes a PC 1, a PC 2, a PC 5, a PC 147, a PC 7, a MFP 3, a MFP 103, and a Router 13. Each of the PC 1, the PC 2, the PC 5, the PC 147, and the PC 7 is an exemplary information processing apparatus (computer) such as a general personal computer. Each of the PC 1, the PC 2, the PC 5, the PC 147, and the PC 7 includes hardware shown in FIG. 2A.

The Operating System (hereinafter abbreviated as "OS") equivalent to Chrome (registered trademark) manufactured by Google Inc. is installed on the PC 1. The Windows (registered trademark) Server OS manufactured by Microsoft Corporation is installed on each of the PC 2, the PC 147, and the PC 5, and the OS equivalent to Linux (registered trademark) is installed on the PC 7. The PC 1, the PC 2, the PC 5, the PC 147, and the PC 7 are connected not only to the network 4, 8, 10, and 6, respectively, configured with an interface (I/F) such as Ethernet (registered trademark) or the like but also to the Internet 12.

Each of multi function printers (hereinafter abbreviated as "MFP") 3 and 103 includes a color inkjet printer, a color facsimile, a color scanner, a flash memory external storage, and the like and is an example of a peripheral device (computer). Each of the MFPs 3 and 103 is an MFP with the model name of Kmmn manufactured by ABC company. Note that a peripheral device may be a device including a printer function, a copier function, a facsimile function, a scanner function, a digital camera function, and a complex function thereof.

Figure 2A:
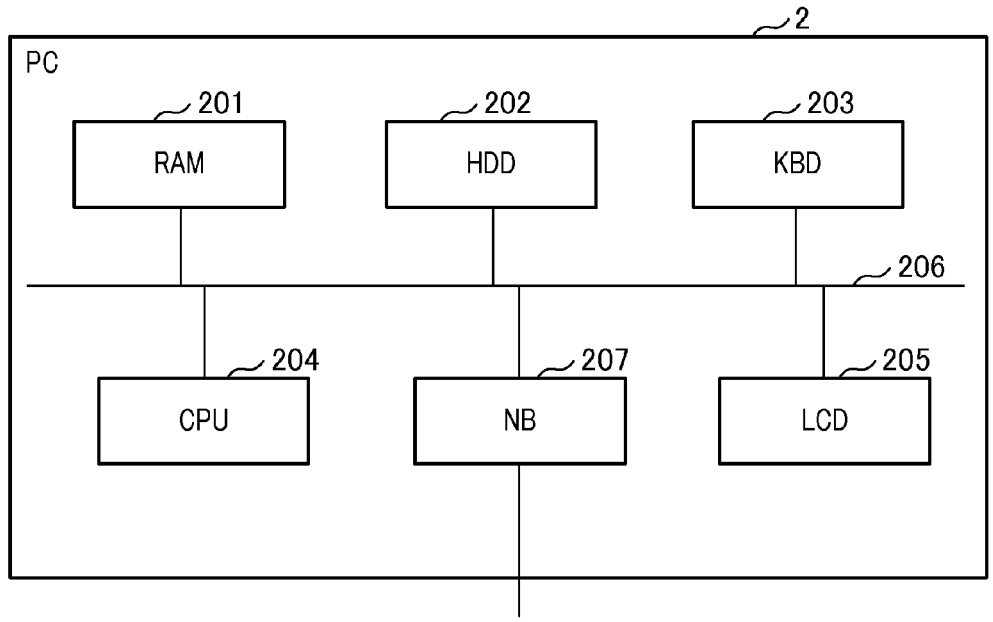
FIG. 2A is a diagram illustrating an example of the hardware configuration of a PC.
Figure 2B:
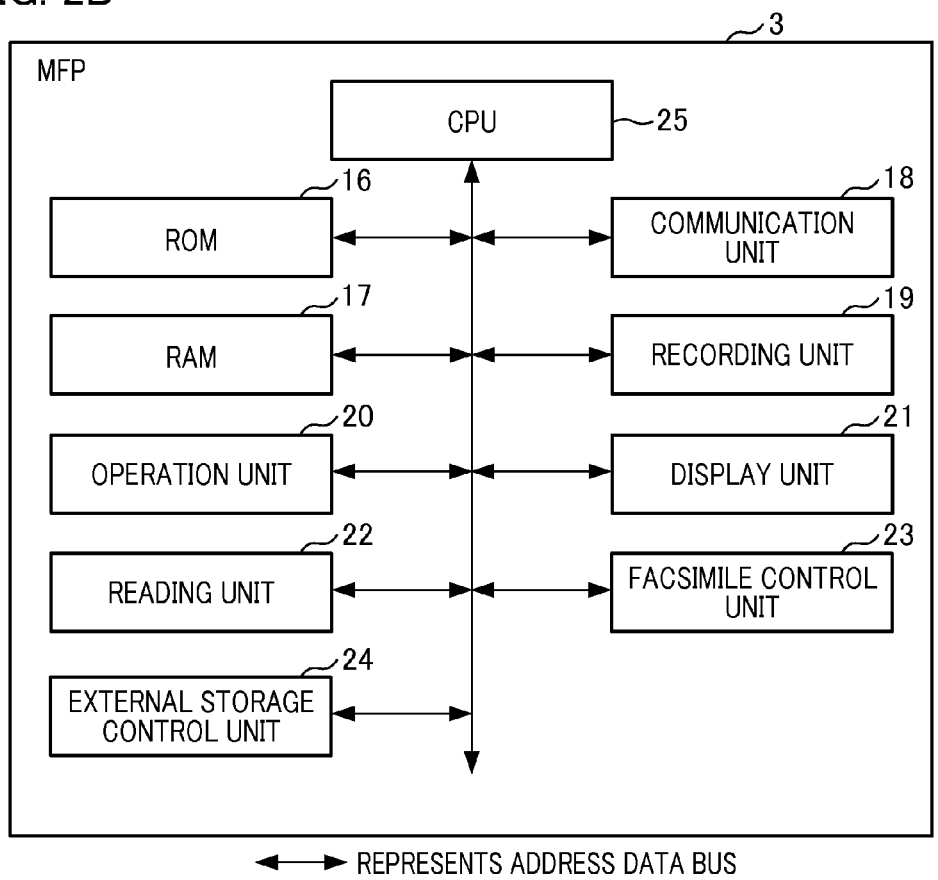
FIG. 2B is a diagram illustrating an example of the hardware configuration of an MFP.

Each of the MFPs 3 and 103 includes hardware shown in FIG. 2B. The MFP 3 is connected to a network 11 configured by Ethernet (registered trademark) and is also connected to the Internet 12. The MFP 103 is connected to a network 104 configured by Ethernet (registered trademark) and is also connected to the Internet 12.

The Router 13 is a Broad Band Router (Wi-Fi BB Router) or the like including Wi-Fi (registered trademark) wireless LAN and is connected to the Internet 12. Examples of a mobile device 14 include a cellular phone, a cellular information terminal, and the like. The mobile device 14 is connected to the Router 13 and is also connected to the Internet 12 via the Router 13. The PC 1, the PC 2, the PC 5, the PC 147, the PC 7, the mobile device 14, the MFP 3, and the MFP 103 can perform two-way communication via the Internet 12 (are communicably connected to each other). A Web Browser 9 is installed on the PC 1, and a Web Browser 15 is installed on the mobile device 14.

An application 145 is an application for document creation using a Web service and is hereinafter referred to as a "document creation APP 145". An application 146 is an application for providing a cloud print service using a Web service and is hereinafter referred to as a "cloud print APP 146". The cloud print APP 146 has a function equivalent to GCP provided by Google Inc. With the use of the cloud print service, the document creation APP 145 is executed by the Web Browser 9 in the PC 1 or the Web Browser 15 in the mobile device and a document is opened so that the document can be printed by the MFP 3 or the MFP 103.

Figure 4:
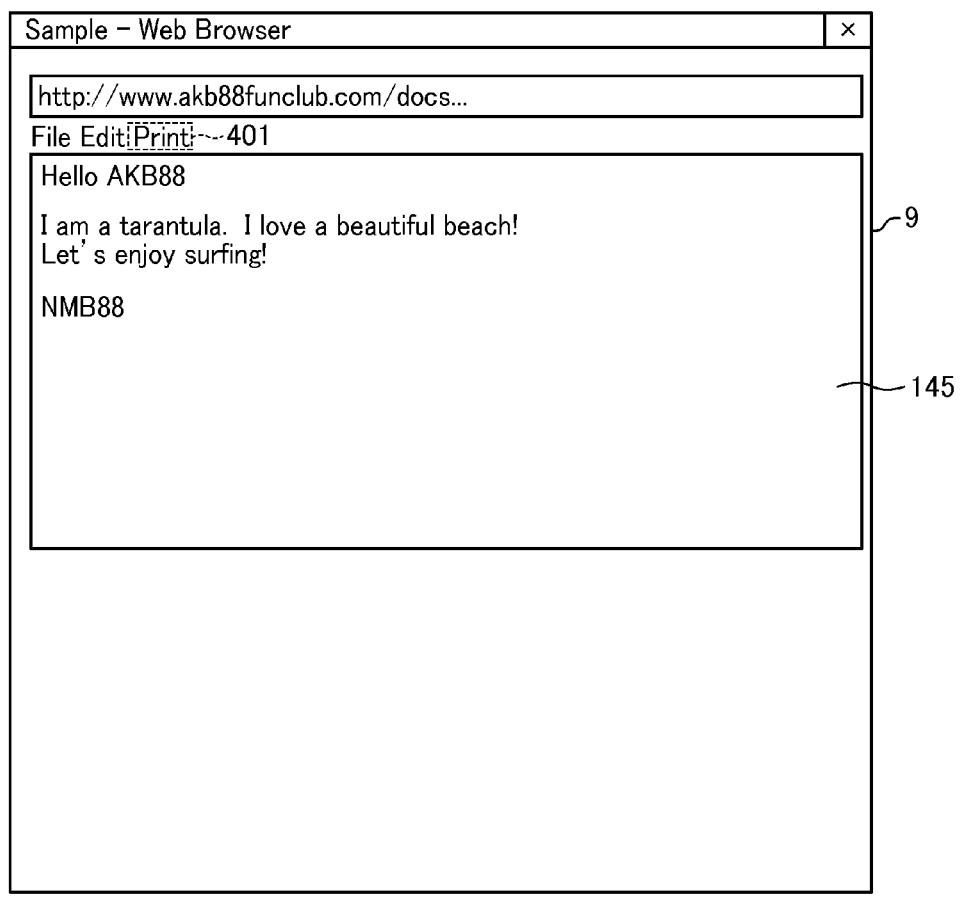
FIG. 4 is a diagram illustrating an example of a Web Browser.
Figure 5:
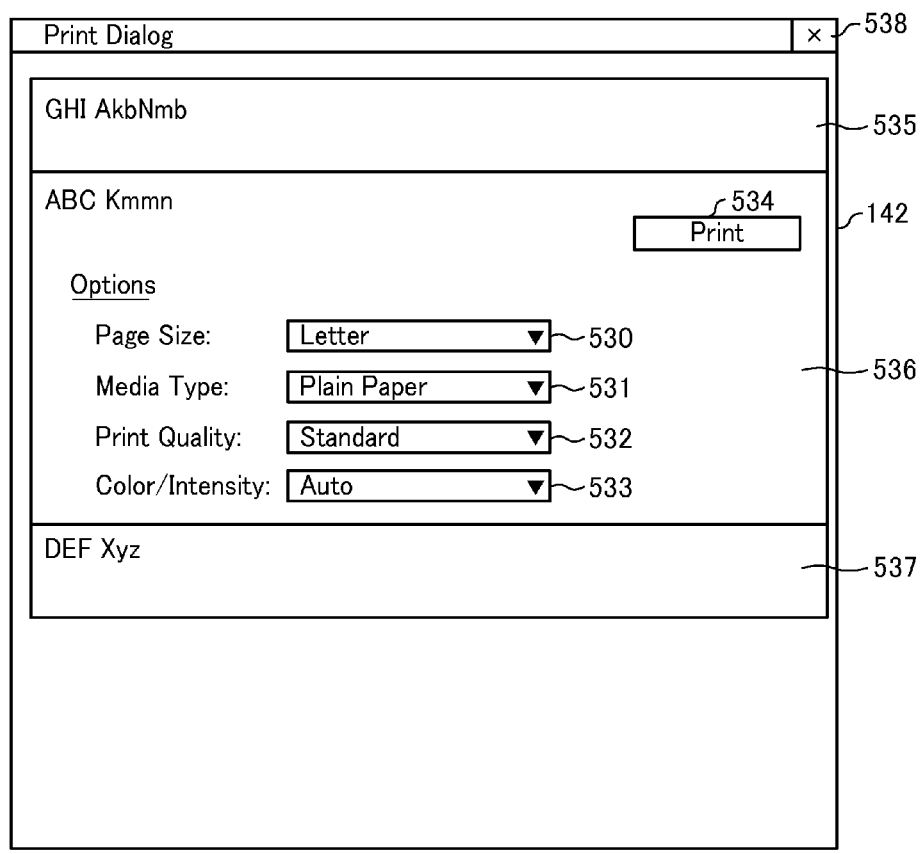
FIG. 5 is a diagram illustrating an example of a print dialogue.

For example, when a user selects a print menu 401 shown in FIG. 4 to print an opened document, a print dialogue 142 shown in FIG. 5 is displayed by the cloud print APP 146. When a user selects a printer using the print dialogue 142 and presses a print button 534 to instruct print execution, the document creation APP 145 creates a print image as a PDF file. Then, the cloud print APP 146 creates a print job using the print image (PDF file) and the print setting value selected by the print dialogue 142, and stores the print job in a print queue for the selected printer in the cloud print service. Also, the cloud print APP 146 transmits a print job notification to the printer (in the example of the present embodiment to be described below, a proxy APP 143).

When printers or MFPs have a function for rendering a PDF file, the printers or the MFPs can print a print job stored in a print queue. However, many inexpensive inkjet printers or MFPs do not have a function for rendering a PDF file. Thus, when a print job stored in a print queue is printed by such an inexpensive printer, a print image (PDF file) needs to be converted into an image format such as JPEG file or the like which can be rendered by the inexpensive printer (an example of pre-processing).

The application 143 is an application for providing a cloud print proxy service that corresponds the MFPs 3 and 103 with the cloud print service provided by the cloud print APP 146. The application 143 is a relay service device that performs relay processing between the MFPs 3 and 103 and the cloud print APP 146 and is hereinafter referred to as a "proxy APP 143". The proxy APP 143 installed on the PC 2 is capable of managing 5,000 printers and MFPs at a time and is capable of corresponding each printer or each MFP with the cloud print service provided by the cloud print APP 146.

An application 144 is an application for providing an image conversion service that converts a PDF file into a JPEG file. The application 144 functions as an intermediate service device that communicates with the proxy APP 143 and performs relation processing relating to the cloud print service and is hereinafter referred to as an "image conversion APP 144".

An application 148 is an application for providing authentication service that issues an access token and is hereinafter referred to as an "authentication APP 148". The authentication APP 148 issues an access token for authentication upon utilization of the image conversion APP 144 by the proxy APP 143. If a cloud print service 146 is, for example, GCP, such service is provided by different vendors. Thus, an authentication processing service provided by the authentication APP 148 is different from an authentication system or an authentication service used by the cloud print APP 146. As described below, the cloud print APP 146 issues an access token for authentication upon utilization of the cloud print APP 146 by the image conversion APP 144. Note that an access token to be issued by the cloud print APP 146 may also be issued by a cloud print service provided by the cloud print APP 146. The authentication APP 148 exports the following Web service API:

Log-in function
Log-out function
User registration function
User authentication function
Access token generation function
Access token validity confirmation function
Access token expiration date/time confirmation function The SSL-encrypted HTTPS POST method is used for these functions. A program related to these processes is embedded in the PC 147 and stored in an HDD 202 shown in FIG. 2A to be described below. The program is read into a RAM 201 and executed by a CPU 204.

Here, in order to use a cloud print service provided by the cloud print APP 146, a log-in with a user account and a password is required. When the cloud print APP 146 registers the printers and MFPs usable for printing in a cloud print service, the cloud print APP 146 firstly acquires an access token, which is used upon utilization of cloud print services, using the user account and the password. Then, the cloud print APP 146 registers the user account by associating it with the printers and MFPs utilizing the acquired access token.

Upon registration of printers and MFPs, the cloud print APP 146 issues a printer ID represented by a unique value and assigns the printer ID to each printer or each MFP and then notifies a printer or the like targeted for registration of the printer ID. The detailed description of processing relating to registration of a printer or the like will be omitted.

FIG. 2 is a diagram illustrating an example of the hardware configuration of a PC and an MFP. Each of the PC 1, the PC 2, the PC 5, the PC 147, and the PC 7 includes hardware shown in FIG. 2A. With reference to FIG. 2A, a description will be given by taking the PC 2 as an example. The PC 2 has a random access memory unit (the RAM 201), a hard disk drive unit (the HDD 202), a keyboard unit (the KBD 203), a CPU 204, a display (the LCD 205), and a network board (the NB 207). The PC 2 also has a bus 206 that connects the components to each other.

The HDD 202 is an exemplary storage unit. The storage unit may be a portable CD-ROM, an internally installed ROM, or the like. The KBD 203 is an exemplary input unit. The CPU 204 is an exemplary control unit. The LCD 205 is an exemplary display unit. The NB 207 is an exemplary communication control unit.

Figure 3:
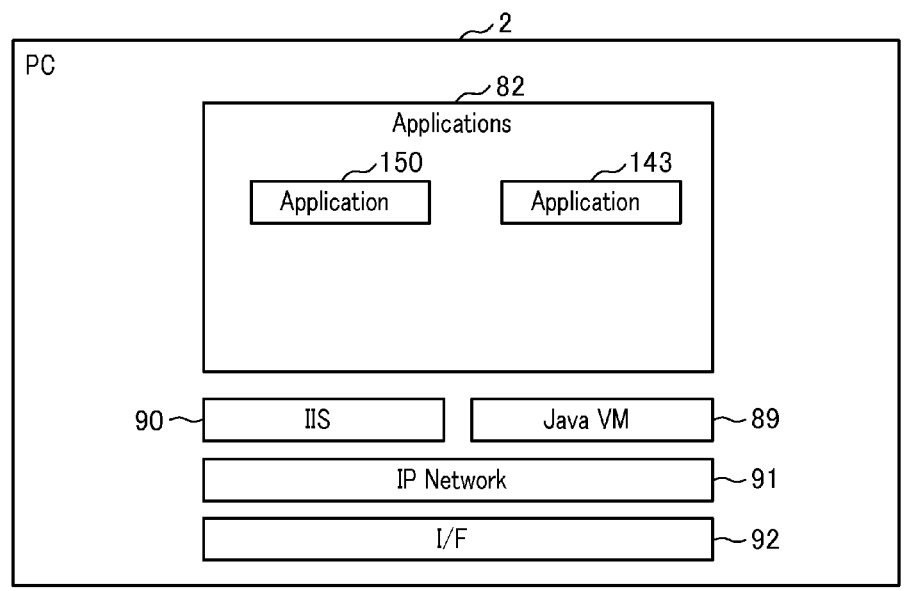
FIG. 3 is a diagram illustrating an example of the configuration of software installed on a PC.

Programs such as the proxy APP 143, modules (software) shown in FIG. 3, or the like are stored in the HDD 202, read into the RAM 201 as required, and executed by the CPU 204. In this manner, the function of the proxy APP 143, the function of modules (software) shown in FIG. 3, and the like are realized. Also, various databases (DB) are stored on the HDD 202 and database information is read into the RAM 201 by the CPU 204 as required.

Each of the MFP 3 and the MFP 103 includes hardware shown in FIG. 2B. In FIG. 2B, a description will be given by taking the MFP 3 as an example. A CPU 25 is constituted by a microprocessor or the like. The CPU 25 functions as a central processing unit of the MFP 3 and controls a RAM 17, a communication unit 18, a recording unit 19, an operation unit 20, a display unit 21, a reading unit 22, a facsimile control unit 23, and an external storage control unit 24 in accordance with the programs stored in a ROM 16.

The ROM 16 stores a program that executes record (print) processing performed by the MFP 3 in accordance with the control by a printer driver (not shown), and processing for notifying a PC of a print operation state. Also, the ROM 16 stores a program that executes facsimile transmission processing or facsimile reception processing performed by the MFP 3 in accordance with the control by a FAX driver (not shown), and processing for notifying a PC of a facsimile operation (transmission or reception) state. Furthermore, the ROM 16 stores a program that executes image read processing performed by the MFP 3 in accordance with the control by a WIA driver (not shown) or a TWAIN driver (not shown), and processing for notifying a PC of a reading operation state.

The RAM 17 temporarily stores print data. Print data is mainly sent from a PC, and the recording unit 19 performs printing based on print data. Also, the RAM 17 temporarily stores image data read by the reading unit 22, facsimile transmission data sent from a PC, facsimile reception data received by the facsimile control unit 23, and the like.

The communication unit 18 includes a connection port for network 4, a connection port for analog telephone line, and the like so as to control Ethernet (registered trademark) and facsimile analog communication. The recording unit 19 is constituted by a recording unit including a inkjet-type recording head, color inks, a carriage, a recording paper conveyance mechanism, and the like and an electrical circuit including an ASIC or the like for generating a pulse for printing at the recording head based on print data.

For example, the display content (image data) of a file being opened by application through a print operation on a printable application or a transmission operation by a facsimile is temporarily stored as a spool file in EMF format in the HDD 202 of the PC 2. The spool file is converted into print data or facsimile transmission data including a command for controlling the MFP 3 via a printer driver or via a FAX driver, and then is transmitted to the MFP 3 via Internet.

The print data received by the MFP 3 is converted into a pulse for printing by the recording unit 19 and is printed on a recording sheet. While, the facsimile transmission data received by the MFP 3 is converted into a facsimile communication protocol by the facsimile control unit 23, and is transmitted to a facsimile device of the other party via an analog telephone line.

The operation unit 20 is constituted by various buttons such as a power button, a reset button, and the like, and accepts an operation for the MFP 3. The display unit 21 is constituted by a liquid crystal display with touch panel that can display and input the state of the MFP 3, various types of setting information, and a telephone number. The reading unit 22 is constituted by a color image sensor, an electrical circuit including an ASIC for image processing, and the like and controls the scanner function.

The facsimile control unit 23 is constituted by a facsimile modem, an analog communication circuit, and the like, and controls facsimile transmission/reception in accordance with a facsimile communication protocol. The external storage control unit 24 is constituted by a slot for mounting of a flash memory, an interface circuit for storage, and the like, and controls the mounted flash memory.

FIG. 3 is a diagram illustrating an example of the configuration of software installed on a PC. In FIG. 3, a description will be given by taking the PC 2 as an example. An I/F 92 is an I/F control stack that controls I/F such as Ethernet (registered trademark) or the like. An IP Network 91 is an IP Network control stack that controls IP Network.

An Internet Information Services (IIS) 90 is an IIS control unit that controls IIS. Application 150 provides a Web service utilizing the Web server function of the IIS control unit. JAVA (registered trademark) Virtual Machine (Java VM) 89 is software that converts Java byte code into platform native code for execution, and the proxy APP 143 is executed on the JAVA VM 89. Applications 82 are a group of applications and are constituted by the proxy APP 143, the application 150, and the like.

FIG. 4 is a diagram illustrating an example of the Web Browser 9 provided by the document creation APP 145 on the PC 1. FIG. 4 shows a document in the opened state. The print menu 401 accepts various operations relating to printing. For example, when a user operates an input unit such as a KBD 203 (user's operation) and presses down the print menu 401 upon printing an opened document, the print dialogue 142 shown in FIG. 5 is displayed.

FIG. 5 is a diagram illustrating an example of the print dialogue 142. The print dialogue 142 is controlled by the cloud print APP 146 as a print setting screen for the MFPs 3 and 103 used by a user. Also, the print dialogue 142 uses the Web Browsers 9 and 15 and is displayed on the Web Browsers.

Each of printer options 535, 536, and 537 is the option of selectable printer. The printer options 535, 536, and 537 represent options corresponding to a printer with the model name of AkbNmb manufactured by GHI company, an MFP (MFP 3) with the model name of Kmmn manufactured by ABC company, and a printer with the model name of Xyz manufactured by DEF company, respectively. FIG. 5 shows the state in which the printer option 536 representing the MFP 3 is selected.

In a paper size selection unit 530, the size of the paper to be printed by the MFP 3 is selected from the following options in response to the user's operation. FIG. 5 shows the state in which the paper size "Letter" is selected.

Paper Size Options: A5, A4, B5, Letter

In a media type selection unit 531, the type of media to be printed by the MFP 3 is selected from the following options in response to the user's operation. FIG. 5 shows the state in which the media size "Plain Paper" is selected.

Media Type Options: Plain Paper, Photo Paper, Postcard

In a print quality selection unit 532, the print quality of paper to be printed by the MFP 3 is selected from the following options in response to the user's operation. FIG. 5 shows the state in which the print quality "Standard" is selected.

Print Quality Options: High, Standard, Fast

In a color/intensity selection unit 533, the color/intensity of paper to be printed by the MFP 3 is selected from the following options in response to the user's operation. FIG. 5 shows the state in which the color/intensity "Auto" is selected.

Color/Intensity Options: Auto, Manual

The print button 534 accepts a print start instruction. When the print button 534 is pressed down by the user's operation, the cloud print APP 146 creates a print job for the MFP 3 associated with the printer option 536. A close button 538 accepts an instruction for closing the print dialogue 142. When the close button 538 is pressed down by the user's operation, the cloud print APP 146 closes the print dialogue 142.

Figure 6:
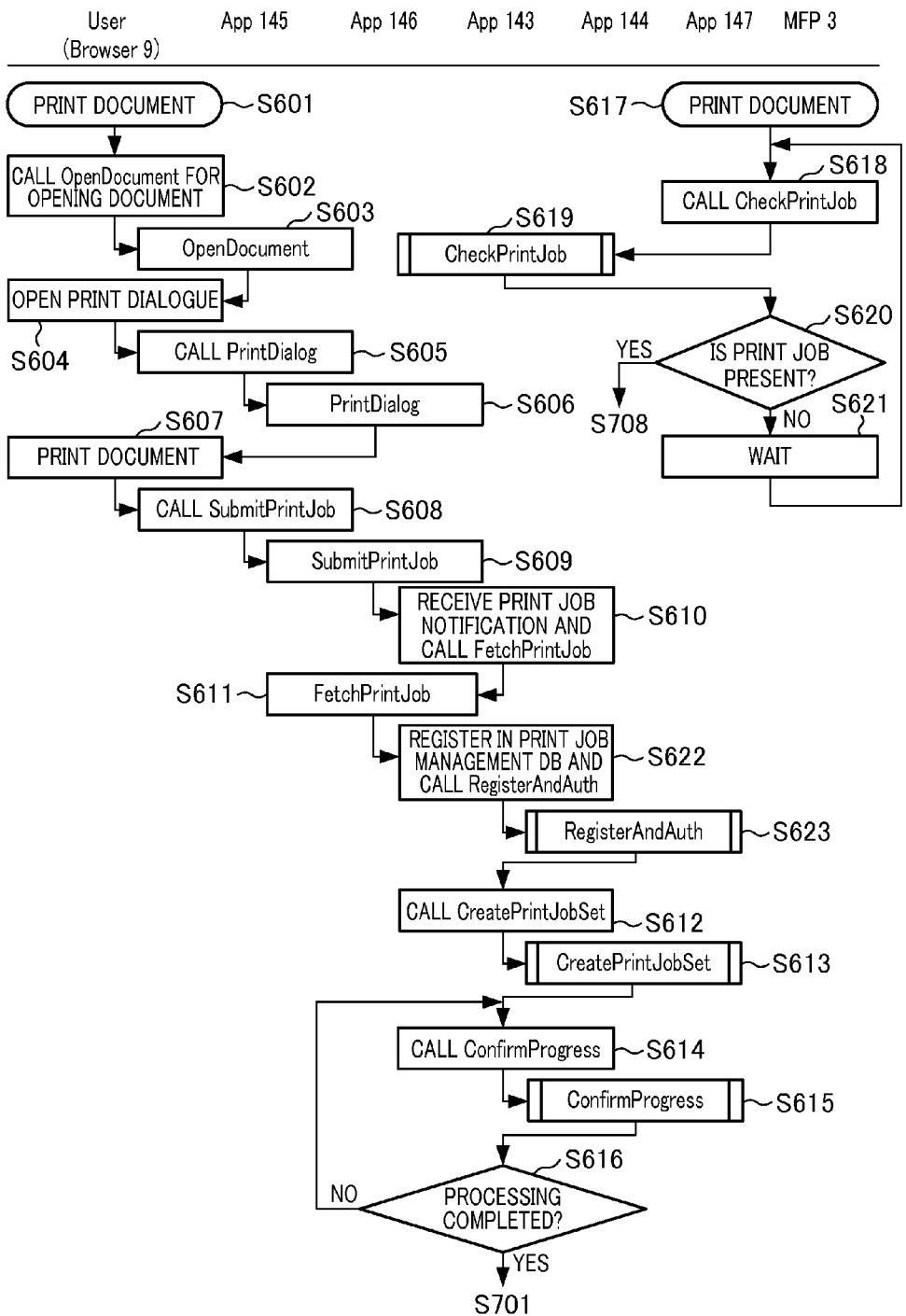
FIG. 6 is a diagram illustrating an example of the flowchart of the processing performed by an information processing system.
Figure 7:
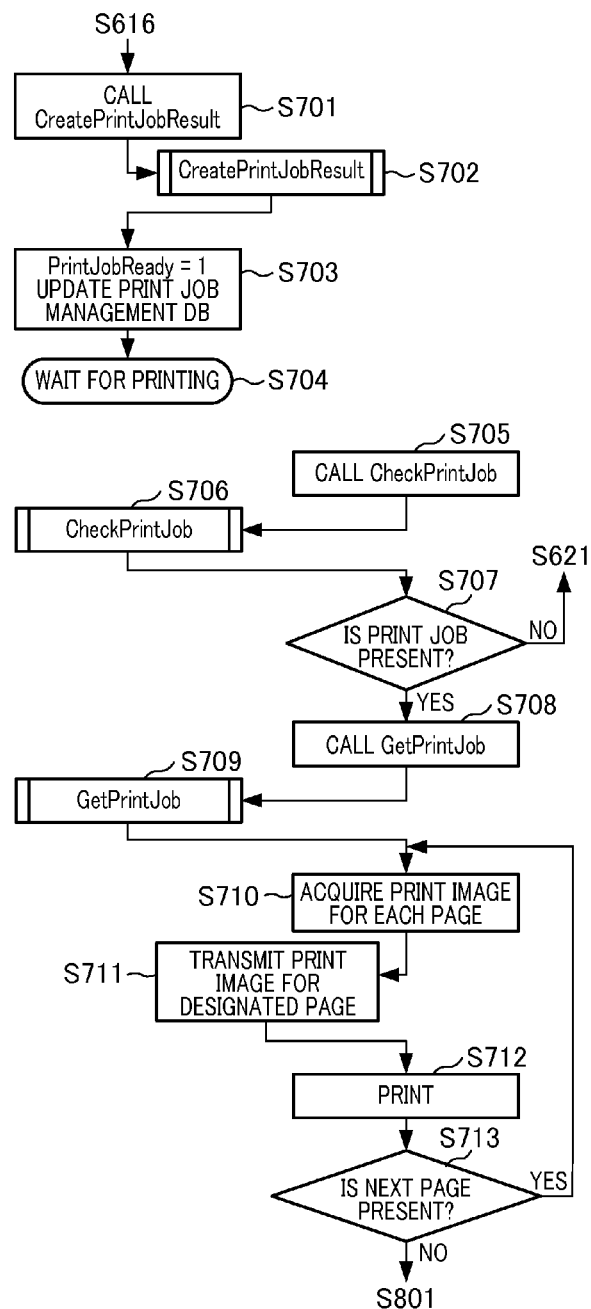
FIG. 7 is a diagram illustrating an example of the flowchart of the processing performed by an information processing system.
Figure 8:
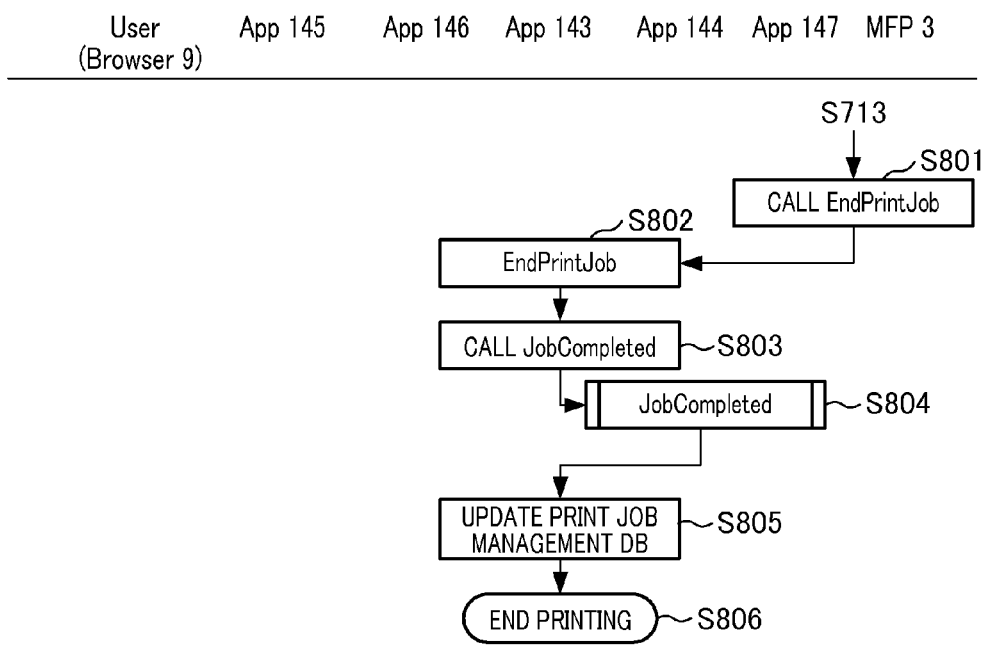
FIG. 8 is a diagram illustrating an example of the flowchart of the processing performed by an information processing system.

FIG. 6, FIG. 7, and FIG. 8 are diagrams illustrating an example of the flowchart of the processing performed by the overall peripheral device control system. Programs relating to these flowcharts are embedded in a PC and an MFP. The application program running on a PC is stored in the HDD 202, read into the RAM 201, and executed by the CPU 204. The application program running on an MFP is stored in the ROM 16, read into the RAM 17, and executed by the CPU 25.

In these flowcharts, longitudinal columns represent processing execution sources. In the present embodiment, a user (the Web Browser 9), the document creation APP 145, the cloud print APP 146, the proxy APP 143, the image conversion APP 144, the authentication APP 148, and the MFP 3 are shown from the left of FIG. 6, FIG. 7, and FIG. 8. A description will be given below of a communication control method by taking an example of a case in which the MFP 3 performs document printing via the PC 1 operated by a user (a series of processing relating to document printing).

Firstly, a description will be given of processing for polling a print job by the MFP 3 with reference to steps S617 to S621. In FIG. 6, step S617 is a step that represents the start of document printing as viewed from the MFP 3 side for convenience sake. Note that the step is intended to simply represent the start of the flowchart without imparting any effect to the execution of processing in the MFP 3.

In step S618, the MFP 3 calls the CheckPrintJob function of a Web service API being exported by the proxy APP 143. When the MFP 3 calls the function in step S618, the MFP 3 transfers the following information (an example of confirmation information) to the proxy APP 143 as query parameters for an HTTP GET request:

Printer ID issued from the cloud print APP 146

Random code

Also, the timing of calling the CheckPrintJob function is arbitrary and a polling operation in which a call is made at periodic intervals is performed. However, the present invention is not limited thereto. For example, a call may also be made upon designation from a user. Furthermore, confirmation information included in query parameters is also not limited to printer ID and random code.

Random code is any 32-bit value generated by the MFP 3. When the CheckPrintJob function is called, the proxy APP 143 executes processing of the CheckPrintJob function (to be described below) shown in FIG. 9A and sends the response (an example of response information) back to the MFP 3 (step S619).

Next, upon receiving the response of the CheckPrintJob function from the proxy APP 143, the MFP 3 confirms information ("print job present response" or "print job absent response") included in the response message in the response (step S620). When the MFP 3 determines in step S620 that the "print job present response" has been received, the process shifts to step S708 shown in FIG. 7, whereas when the MFP 3 determines in step S620 that the "print job absent response" has been received, the process shifts to step S621.

In step S621, the MFP 3 waits for a predetermined time (in the present embodiment, 1 minute), and the process shifts to step S618. As described above, the MFP 3 polls the Check-PrintJob function being exported by the proxy APP 143 at predetermined time intervals (regular intervals).

Next, a description will be given of document print processing. Here, step S601 is a step that represents the start of document printing as viewed from the user side for convenience sake. Note that the step is intended to simply represent the start of the flowchart without imparting any effect to the execution of user's operation or application.

Firstly, a user activates the Web Browser 9 and accesses and logs in the URL of the document creation APP 145. When the user designates a document and provides an instruction for opening the document, the Web Browser 9 calls the OpenDocument function of the Web service API being exported by the document creation APP 145 using the document as an input parameter (step S602).

When the OpenDocument function is called, the document creation APP 145 opens the document designated by the input parameter and transmits the document information to the Web Browser 9 (step S603). For example, as shown in FIG. 4, the document is in an opened state on the Web Browser 9 via the document creation APP 145.

When the print menu 401 is pressed down by the user's operation to print the document, the document creation APP 145 is notified of the information via the Web Browser 9 (step S604). Upon receiving the notification, the document creation APP 145 calls the PrintDialog function of the Web service API being exported by the cloud print APP 146 (step S605).

When the PrintDialog function is called, the cloud print APP 146 opens the print dialogue 142 and transmits the information to the Web Browser 9 (step S606). For example, as shown in FIG. 5, the print dialogue 142 is displayed on the Web Browser 9.

By operating the input unit, a user selects a printer (in the example shown in FIG. 5, the printer option 536 associated with the MFP 3) for printing from a plurality of printer options, selects a desired set value from print setting values, and presses down the print button 534. When the print button 534 is pressed down, the document creation APP 145 is notified from the user of information indicating the print start request and information relating to the print setting value via the Web Browser 9 (step S607).

Information relating to the print setting value is URL in which a print setting file (XML file) describing the print setting value selected by a user is stored. Upon receiving the notification, the document creation APP 145 creates a print image as a PDF file. Then, the document creation APP 145 calls the SubmitPrintJob function of the Web service API being exported by the cloud print APP 146 using the created PDF file, information relating to the print setting value, and the like as input parameters (step S608).

When the SubmitPrintJob function is called, the cloud print APP 146 creates a print job based on the PDF file, information relating to the print setting value, and the like that are designated by the input parameters. Then, the cloud print APP 146 transmits a print job notification to a printer (in the present example, the proxy APP 143 because image format conversion is necessary for the MFP 3) associated with the selected printer option (step S609).

Also, a print job includes at least the following information (hereinafter referred to as "print job information").
Print job ID issued by the cloud print APP 146
Printer ID issued by the cloud print APP 146
Access token for utilization of a cloud print service provided by the cloud print APP 146
URL in which a print setting file (XML file) describing a print setting value is stored
URL of the storage destination of the print image (PDF file)
Time stamp Upon receiving the print job notification, the proxy APP 143 calls the FetchPrintJob function of the Web service API being exported by the cloud print APP 146 (step S610). When the FetchPrintJob function is called, the cloud print APP 146 transmits information (print job information) included in the print job created in step S609 to the proxy APP 143 (step S611).

Upon receiving print job information, the proxy APP 143 acquires the necessary information from print job information, and stores the acquired information and information required for other control in a print job management database (step S622). Then, the proxy APP 143 calls the RegisterAndAuth function of the Web service API being exported by the image conversion APP 144 (step S622).

At this time, the CPU 204 of the proxy APP 143 functions as a transmission unit that transmits an authentication request and a processing execution request to the image conversion APP 144. More specifically, when the proxy APP 143 calls the function in step S622, the proxy APP 143 transfers the following information (an example of pre-processing information) to the image conversion APP 144 as input parameters for the HTTPS POST request:
Administrator ID utilizing the authentication APP 148
Administrator password utilizing the authentication APP 148
User ID utilizing the image conversion APP 144
User password utilizing the image conversion APP 144
Service ID
Printer ID issued by the cloud print APP 146
Print job ID issued by the cloud print APP 146

Here, the service ID represents an ID for specifying each cloud print service. For example, the following IDs can be designated. Note that parentheses ( ) represent the summary of each cloud print service.
GCP Consumer (GCP for consumer)
GCP Enterprise (GCP for enterprise)
Email Print Consumer (Email printing for consumer)
Email Print Enterprise (Email printing for enterprise)
ABC Cloud Print (cloud printing provided by ABC company)

Information "administrator ID utilizing the authentication APP 148" is identification information about the proxy APP 143 and is registered in the proxy APP 143 in advance. Information "administrator password utilizing the authentication APP 148" is a password for authenticating the proxy APP 143 ID and is registered in the proxy APP 143 in advance. Information "user ID utilizing the image conversion APP 144" is identification information uniquely assigned to each MFP managed by the proxy APP 143. Information "user password utilizing the image conversion APP 144" is a password for authenticating the user ID. Information "user ID utilizing the image conversion APP 144" and "user password utilizing the image conversion APP 144" is automatically created by the proxy APP 143.

The image conversion APP 144 functions as an reception unit that accepts an authentication request and a processing execution request. When the RegisterAndAuth function is called, the image conversion APP 144 executes processing of the RegisterAndAuth function to be described below with reference to FIG. 14, and sends the response back to the proxy APP 143 (step S623). The response includes the access token for utilization of the image conversion APP 144 issued by the authentication APP 148.

The proxy APP 143 receives the response of the RegisterAndAuth function from the image conversion APP 144. The proxy APP 143 which has received the response calls the CreatePrintJobSet function of the Web service API being exported by the image conversion APP 144 (step S612).

When the proxy APP 143 calls the function in step S612, the proxy APP 143 transfers the following information (an example of pre-processing information) to the image conversion APP 144 as input parameters for the HTTPS POST request:

Service ID
Printer ID issued by the cloud printing APP 146
Print job ID issued by the cloud printing APP 146
Access token for utilization of the image conversion APP 144
Access token for utilization of a cloud print service
URL of the storage destination of the print image (PDF file)

In step S622, the print job management database of the proxy APP 143 stores the following information:
[Print Job Management Database]
Search key: print job ID issued by the cloud print APP 146
Service ID
Printer ID issued by the cloud print APP 146
Access token for utilization of the image conversion APP 144
Access token for utilization of a cloud print service
URL of the storage destination of the print setting file (XML file)
URL of the storage destination of the print image (PDF file)
Access token to the image conversion APP 144
Print job access URL (URL of the storage destination of a JPEG file)
The total number of pages in a print image (JPEG file)
Print job preparation completion (PrintJobReady) (0: Incomplete, 1: Complete)

At this time, the proxy APP 143 sets "0" to print job preparation completion (PrintJobReady) as the initial value representing that the print job preparation is not completed. Also, the proxy APP 143 sets the initial value "0" to the total number of pages in a print image (JPEG file).

When the CreatePrintJobSet function is called, the image conversion APP 144 executes processing of the CreatePrintJobSet function to be described below with reference to FIG. 10A, and sends the response back to the proxy APP 143 (step S613). The response includes the session ID issued by the image conversion APP 144.

Upon receiving the response of the CreatePrintJobSet function from the image conversion APP 144, the proxy APP 143 calls the ConfirmProgress function of the Web service API being exported by the image conversion APP 144 (step S614). When the proxy APP 143 calls the function in step S614, the proxy APP 143 transfers the following information (an example of confirmation information) to the image conversion APP 144 as query parameters for the HTTP GET request:

Session ID
Sequence

The session ID is information included in the response of the CreatePrintJobSet function, and the sequence is any number created by the proxy APP 143.

When the ConfirmProgress function is called, the image conversion APP 144 executes processing of the ConfirmProgress function to be described below with reference to FIG. 11A, and sends the response (an example of response information) back to the proxy APP 143 (step S615). The proxy APP 143 receives the response of the ConfirmProgress function from the image conversion APP 144. Then, the proxy APP 143 confirms the content ("processing response", "processing completion response", or "error response") included in the response message in the response (step S616). When it is determined in step S616 that the proxy APP 143 has received "processing completion response", the process shifts to step S701 shown in FIG. 7, whereas when it is determined in step S616 that the proxy APP 143 has received "processing response", the process shifts to step S614.

When an error occurs during download/image conversion thread processing for the image conversion APP 144 to be described below with reference to FIG. 10B, the proxy APP 143 receives "error response" in step S616, and stops print processing. However, it is not essential to the present embodiment that print processing stops, and thus, the detailed description will be omitted. Thus, in the step subsequent to step S616, a description will be given focusing on a case in which the proxy APP 143 has received "processing completion response" or "processing response".

As shown in FIG. 7, in step S701, the proxy APP 143 calls the CreatePrintJobResult function of the Web service API being exported by the image conversion APP 144. When the proxy APP 143 calls the function in step S701, the proxy APP 143 transfers the following information (an example of location acquisition information) to the image conversion APP 144 as input parameters for the HTTPS POST request:

Printer ID issued by the cloud print APP 146
Print job ID issued by the cloud print APP 146

When the CreatePrintJobResult function is called, the image conversion APP 144 executes processing of the CreatePrintJobResult function to be described below with reference to FIG. 12, and sends the response back to the proxy APP 143 (step S702).

Upon receiving the response of the CreatePrintJobResult function from the image conversion APP 144, the proxy APP 143 sets "1" to PrintJobReady (step S703). Then, the proxy APP 143 sets "1" representing print job preparation completion to print job preparation completion (PrintJobReady) in the print job management database (step S703). In this manner, the MFP 3 is in a print wait state (step S704).

As described in steps S618 to S621 shown in FIG. 6, the MFP 3 polls the CheckPrintJob function being exported by the proxy APP 143 at predetermined time intervals. The process in step S705 is equivalent to that in step S618. A description will be given of a case in which the MFP 3 calls the CheckPrintJob function being exported by the proxy APP 143 in step S705 when the MFP 3 is in a print wait state in step S704. When the CheckPrintJob function is called, the proxy APP 143 executes processing of the CheckPrintJob function to be described below with reference to FIG. 9A, and sends the response back to the MFP 3 (step S706).

Upon receiving the response of the CheckPrintJob function from the proxy APP 143, the MFP 3 confirms the content ("print job present response" or "print job absent response") included in the response message in the response (step S707). When it is determined in step S707 that the MFP 3 has received the "print job present response", the process shifts to step S708, whereas when it is determined in step S707 that the MFP 3 has received the "print job absent response", the process shifts to step S621.

In step S708, the MFP 3 calls the GetPrintJob function of the Web service API being exported by the proxy APP 143.

When the MFP 3 calls the function in step S708, the MFP 3 transfers the following information (an example of acquisition information) to the proxy APP 143 as a query parameter of the HTTPS GET request:

Printer ID issued by the cloud print APP 146

When the GetPrintJob function is called, the proxy APP 143 executes processing of the GetPrintJob function to be described below with reference to FIG. 9B, and sends the response back to the MFP 3 (step S709). Upon receiving the response of the GetPrintJob function from the proxy APP 143, the MFP 3 transmits a print image acquisition request to the image conversion APP 144 based on the content included in the response message of the response (step S710).

Here, the content included in the response message of the response is a print job access URL (URL of the storage destination of a print image (JPEG file)), the total number of pages in a print image (JPEG file), and an access token for the image conversion APP 144. Also, the print image acquisition request is a request for acquiring a print image (JPEG file) of each page from the image conversion APP 144.

In the present embodiment, the print job access URL is the storage destination URL of the PC 5 having the image conversion App 144, but may also be the storage destination URL of another PC. For example, the print job access URL may be transmitted directly from the PC 5. For example, the PC 2 having the App 143 may acquire a print image of the designated page from the PC 5 and transmit the acquired print image to the MFP 3. For example, the PC 2 may transmit the URL of the storage destination of the acquired print image to the MFP 3.

Upon receiving the print image acquisition request from the MFP 3, the image conversion APP 144 allows access to a print image (JPEG file) of the designated page from the MFP 3, and transmits the print image to the MFP 3 (step S711). Upon receiving the print image transmitted from the image conversion APP 144, the MFP 3 prints the print image (step S712). Next, the MFP 3 confirms the presence/absence of the next page based on the total number of pages in the print image (JPEG file) (step S713). At this time, when the MFP 3 determines that the next page is present, the process shifts to step S710, and the MFP 3 transmits a print image acquisition request for acquiring a print image of the next page to the image conversion APP 144. On the other hand, when the MFP 3 determines that the next page is absent, the process shifts to step S801 shown in FIG. 8.

The SSL-encrypted HTTPS GET method is utilized for acquisition processing for acquiring a print image (JPEG file) in steps S710 to S712.

As shown in FIG. 8, in step S801, the MFP 3 calls the EndPrintJob function of the Web service API being exported by the proxy APP 143. The SSL-encrypted HTTPS GET method is utilized for calling the EndPrintJob function. When the MFP 3 calls the function in step S801, the MFP 3 transfers the following information (an example of end information) to the proxy APP 143 as query parameters for the HTTPS GET request:

Printer ID issued by the cloud print APP 146

Print job ID issued by the cloud print APP 146

When the EndPrintJob function is called (step S802), the proxy APP 143 calls the JobCompleted function of the Web service API being exported by the image conversion APP 144 (step S803). When the proxy APP 143 calls the function in step S803, the proxy APP 143 transfers the following information (an example of job processing end information) to the image conversion APP 144 as input parameters for the HTTPS POST request:

Printer ID issued by the cloud print APP 146

Print job ID issued by the cloud print APP 146

When the JobCompleted function is called, the image conversion APP 144 executes processing of the JobCompleted function to be described below with reference to FIG. 11B, and sends the response back to the proxy APP 143 (step S804). Upon receiving the response of the JobCompleted function from the image conversion APP 144, the proxy APP 143 deletes information relating to the print job from the print job management database, and updates the print job management database (step S805). Then, the proxy APP 143 ends document print processing (step S806).

Figure 9A:
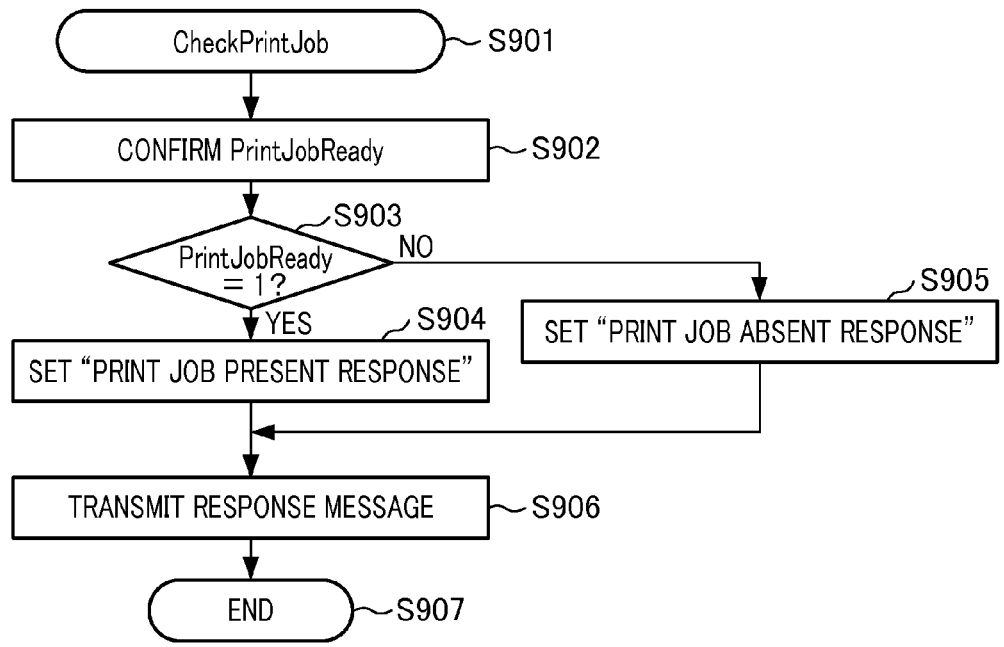
FIGS. 9A and 9B are diagrams illustrating examples of the flowchart of the processing performed by a proxy APP.

Next, a description will be given of processing for the Web service API to be exported by the proxy APP 143 with reference to FIGS. 9A and 9B. FIG. 9A is a diagram illustrating an example of the flowchart of processing of the CheckPrintJob function. FIG. 9B is a diagram illustrating an example of the flowchart of processing of the GetPrintJob function. The HTTP GET method is utilized for the CheckPrintJob function. The SSL-encrypted HTTPS GET method is utilized for the GetPrintJob function. A program relating to these flowcharts is embedded in the PC 2, stored in the HDD 202, read into the RAM 201, and executed by the CPU 204.

When the MFP 3 calls the CheckPrintJob function in step S618 shown in FIG. 6 and in step S705 shown in FIG. 7, the proxy APP 143 executes processing of the CheckPrintJob function shown in FIG. 9A.

As shown in FIG. 9A, when processing of the CheckPrintJob function is started (step S901), the proxy APP 143 confirms print job preparation completion (PrintJobReady) in the print job management database (step S902). In step S901, the printer ID issued by the cloud print APP 146 and the random code are transferred from the MFP 3 as query parameters for the HTTP GET request.

When the proxy APP 143 determines that "1" representing that print job preparation is completed is set to print job preparation completion (PrintJobReady), that is, a print job for the MFP 3 is present (YES in step S903), the process shifts to step S904. On the other hand, when the proxy APP 143 determines that "0" representing that print job preparation is not completed is set, that is, a print job for the MFP 3 is absent (NO in step S903), the process shifts to step S905.

In step S904, the proxy APP 143 sets the "print job present response" to the response message to be included in the BODY of the response to the HTTP GET request, and the process shifts to step S906. In step S905, the proxy APP 143 sets the "print job absent response" to the response message to be included in the BODY of the response to the HTTP GET request, and the process shifts to step S906. In step S906, the proxy APP 143 transmits the response message to the issuance source (in the present example, the MFP 3) of the GET request, and ends processing of the CheckPrintJob function (step S907).

Here, a detailed description will be given of the "print job present response" and the "print job absent response". Information representing the state in which a print job is present and information representing the state in which a print job is absent are "10101010" and "01010101", respectively. Each of the "print job present response" and the "print job absent response" is the result of computation using a random code and information representing the state, and is constituted by, for example, character string information in which the following information is converted into a character string:

"Print job present response"=random code XOR 10101010

"Print job absent response"=random code XOR 01010101

As described above, the proxy APP 143 does not use visible information defined by XML or the like as the response to the HTTP GET request. The proxy APP 143 uses generally incomprehensible character string information. In this manner, a malfunction or a fraudulent control caused by an unauthorized access to the Web service API may be prevented. The configuration for preventing such an unauthorized access is not limited to this example. More complex computation such as hashing or the like may also be combined.

Figure 9B:
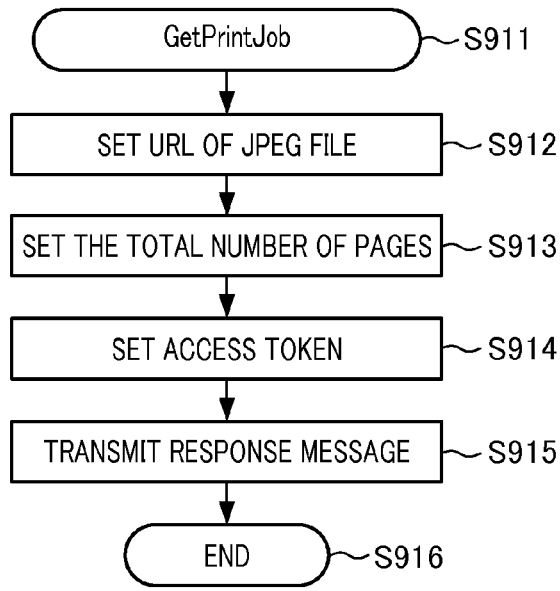

Also, when the MFP 3 calls the GetPrintJob function in step S708 shown in FIG. 7, the proxy APP 143 executes processing of the GetPrintJob function shown in FIG. 9B. As shown in FIG. 9B, the proxy APP 143 starts processing of the GetPrintJob function (step S911). Then, the proxy APP 143 sets the storage destination URL of a print image (JPEG file) to the response message to be included in the BODY of the response to the HTTPS GET request (step S912), and the process shifts to step S913.

In step S913, the proxy APP 143 sets the total number of pages in the print image (JPEG file) to the response message to be included in the BODY of the response to the HTTPS GET request, and the process shifts to step S914. In step S914, the proxy APP 143 sets an access token for the image conversion APP 144 to the response message to be included in the BODY of the response to the HTTPS GET request, and the process shifts to step S915.

In step S915, the proxy APP 143 transmits the response message to the issuance source (in the present example, the MFP 3) of the GET request, and ends processing of the GetPrintJob function (step S916).

Next, a description will be given of processing for the Web service API to be exported by the image conversion APP 144 and processing of thread function with reference to FIGS. 10A and 10B. FIG. 10A is a diagram illustrating an example of the flowchart of processing of the CreatePrintJobSet function. FIG. 10B is a diagram illustrating an example of the flowchart of processing of the download/image conversion thread function. The SSL-encrypted HTTPS POST method is utilized for the CreatePrintJobSet function.

A program relating to these flowcharts is embedded in the PC 5, stored in the HDD 202, read into the RAM 201, and executed by the CPU 204.

Figure 10A:
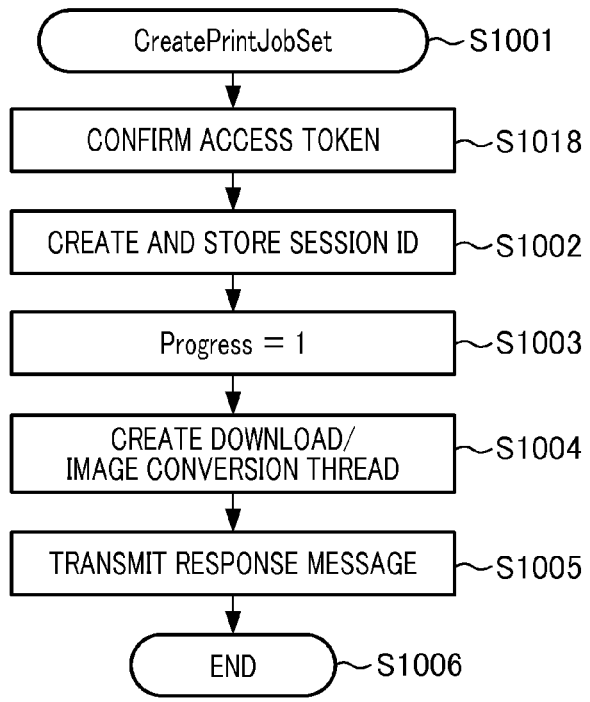
FIGS. 10A and 10B are diagrams illustrating examples of the flowchart of the processing performed by an image conversion APP.

When the proxy APP 143 calls the CreatePrintJobSet function in step S612 shown in FIG. 6, the image conversion APP 144 executes processing of the CreatePrintJobSet function shown in FIG. 10A.

As shown in FIG. 10A, the image conversion APP 144 starts processing of the CreatePrintJobSet function (step S1001), and executes access token confirmation processing to be described below with reference to FIG. 15 (step S1018). At this time, the following information is passed as arguments of the processing (subroutine function):

Service ID
    Printer ID issued by the cloud print APP 146
    Print job ID issued by the cloud print APP 146
    Access token for utilization of the image conversion APP 144

Then, the image conversion APP 144 generates a session ID and stores the session ID in the session management database (step S1002), and the process shifts to step S1003. The session management database stores the following information:

[Session Management Database]
    Search key: Session ID issued by the image conversion APP 144
    Service ID
    Printer ID issued by the cloud print APP 146
    Print job ID issued by the cloud print APP 146
    Access token for utilization of a cloud print service
    URL of the storage destination of the print image (PDF file)
    Access token for utilization of the image conversion APP 144
    Print job access URL (URL of the storage destination of a JPEG file)
    Progress state representing the progress of processing (Progress)

Here, the image conversion APP 144 acquires the Printer ID and the print job ID issued by the cloud print APP 146 among the input parameters of the CreatePrintJobSet function. Then, the image conversion APP 144 stores the printer ID and the print job ID issued by the cloud print APP 146 in the session management database.

Also, the image conversion APP 144 acquires an access token for utilization of a cloud print service among the input parameters of the CreatePrintJobSet function. Then, the image conversion APP 144 stores the access token for utilization of a cloud print service in the session management database.

Furthermore, the image conversion APP 144 acquires URL of the storage destination of the print image (PDF file) among the input parameters of the CreatePrintJobSet function, and stores URL of the storage destination of the print image (PDF file) in the session management database.

Next, the image conversion APP 144 sets "1" representing processing to progress state (Progress) representing the progress of processing in the session management database (step S1003), and the process shifts to step S1004. In step S1004, the image conversion APP 144 creates a download/image conversion thread, and the process shifts to step S1005. Download/image conversion thread processing will be described below with reference to FIG. 10B.

Next, the image conversion APP 144 sets "SUCCESS" representing the fact that the function has been successful and thus has been normally ended and the session ID created in step S1002 to the response message to be included in the BODY of the response to the HTTP POST request (step S1005). Then, the image conversion APP 144 transmits the response message to the issuance source (in the present example, the proxy APP 143) of the POST request (step S1005). Then, the image conversion APP 144 ends processing of the CreatePrintJobSet function (step S1006).

Also, when the image conversion APP 144 creates a download/image conversion thread in step S1004, a thread different from the CreatePrintJobSet function is activated. Then, download/image conversion thread processing shown in FIG. 10B is executed in the thread.

Figure 10B:
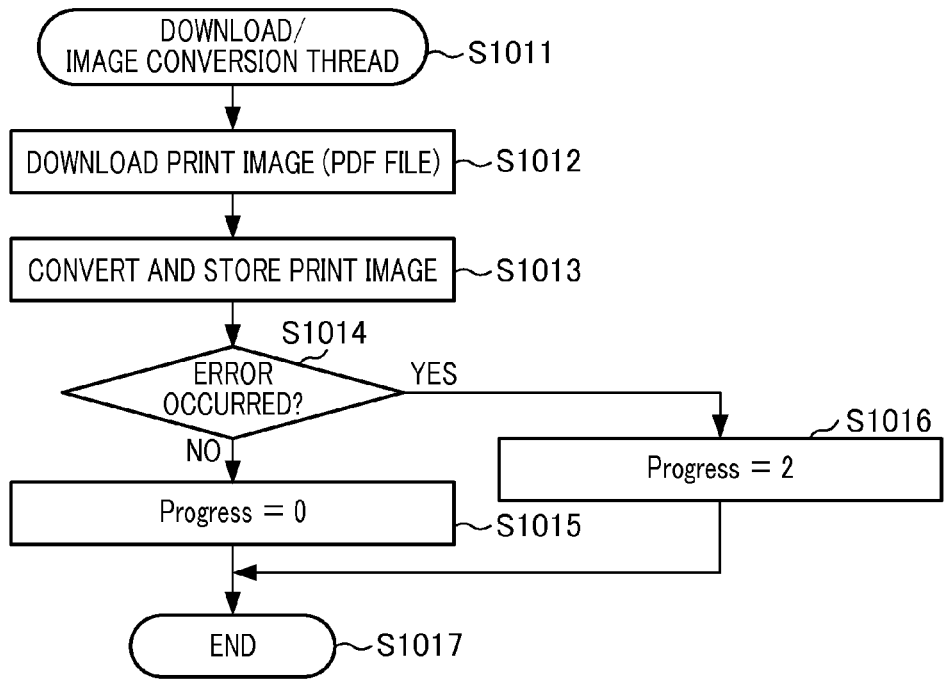

As shown in FIG. 10B, the image conversion APP 144 starts download/image conversion thread processing (step S1011). Then, the image conversion APP 144 accesses URL of the storage destination of the print image (PDF file) by means of the SSL-encrypted HTTPS GET method and utilizing the access token for utilization of a cloud print service. In other words, the image conversion APP 144 downloads the print image (PDF file) from a cloud print service, and temporarily stores the downloaded print image (PDF file) in the RAM 201 (step S1012).

After completion of downloading, the image conversion APP 144 converts the print image (PDF file) into a JPEG file in a format printable by the MFP 3. The HDD 202 of the PC 5 stores setting information indicating a printable format for each printer or each MFP in advance. Then, the image conversion APP 144 stores the JPEG file in a folder composed with the printer ID and the print job ID issued by the cloud print APP 146 (step S1013).

Also, in step S1013, the image conversion APP 144 sets an access token for the image conversion APP 144 to an access token for the image conversion APP 144 in the session management database. The access token for the image conversion APP 144 is an access token for accessing the print image (JPEG file) by a printer or an MFP (in the present example, the MFP 3) associated with the printer ID issued by the cloud print APP 146. Furthermore, in step S1013, the image conversion APP 144 sets URL of the storage destination of the print image (JPEG file) (first page) to the print job access URL in the session management database.

EXAMPLE

Printer ID: abcde
Print job ID: 1234
Total number of pages in the print image (JPEG file): 3 pages
Data storage in the PC 2:
C:\abcde1234\
P1.jpg
P2.jpg
p3.jpg
URL:http://www.abc.xxx/printdata/
　?pi=abcde&ji=1234&p=1

The URL represents the JPEG file of the first page (p1.jpg). Thus, upon acquiring a print image for each page, the MFP 3 assigns the page number to be acquired to the query parameter "p" representing a page number. In step S1013, the image conversion APP 144 converts the print image (PDF file) into the print image (JPEG file). When the conversion has been completed for all pages, the image conversion APP 144 deletes the print image (PDF file) downloaded in step S1012 from the RAM 201.

Next, the image conversion APP 144 determines whether or not an error has been detected during processing in any one of steps S1011 to S1013 (step S1014). At this time, when the image conversion APP 144 determines that an error has been detected, the process shifts to step S1016, whereas when the image conversion APP 144 determines that no error has been detected, the image conversion APP 144 determines that processing is normally ended, and the process shifts to step S1015.

In step S1015, the image conversion APP 144 sets "0" representing "normal end" to the progress state (Progress) in the session management database, and ends download/image conversion thread processing (step S1017). In step S1016, the image conversion APP 144 sets "2" representing "error end" to the progress state (Progress) in the session management database, and ends download/image conversion thread processing (step S1017). In step S1017, the image conversion APP 144 deletes information relating to the print job from the session management database to thereby update the session management database.

Next, a description will be given of processing for the Web service API to be exported by the image conversion APP 144 with reference to FIGS. 11A and 11B. FIG. 11A is a diagram illustrating an example of the flowchart of processing of the ConfirmProgress function. FIG. 11B is a diagram illustrating an example of the flowchart of processing of the JobCompleted function.

Here, the HTTP GET method is utilized for the ConfirmProgress function. The SSL-encrypted HTTPS POST method is utilized for the JobCompleted function. A program relating to these flowcharts is embedded in the PC 5, stored in the HDD 202, read into the RAM 201, and executed by the CPU 204.

Figure 11A:
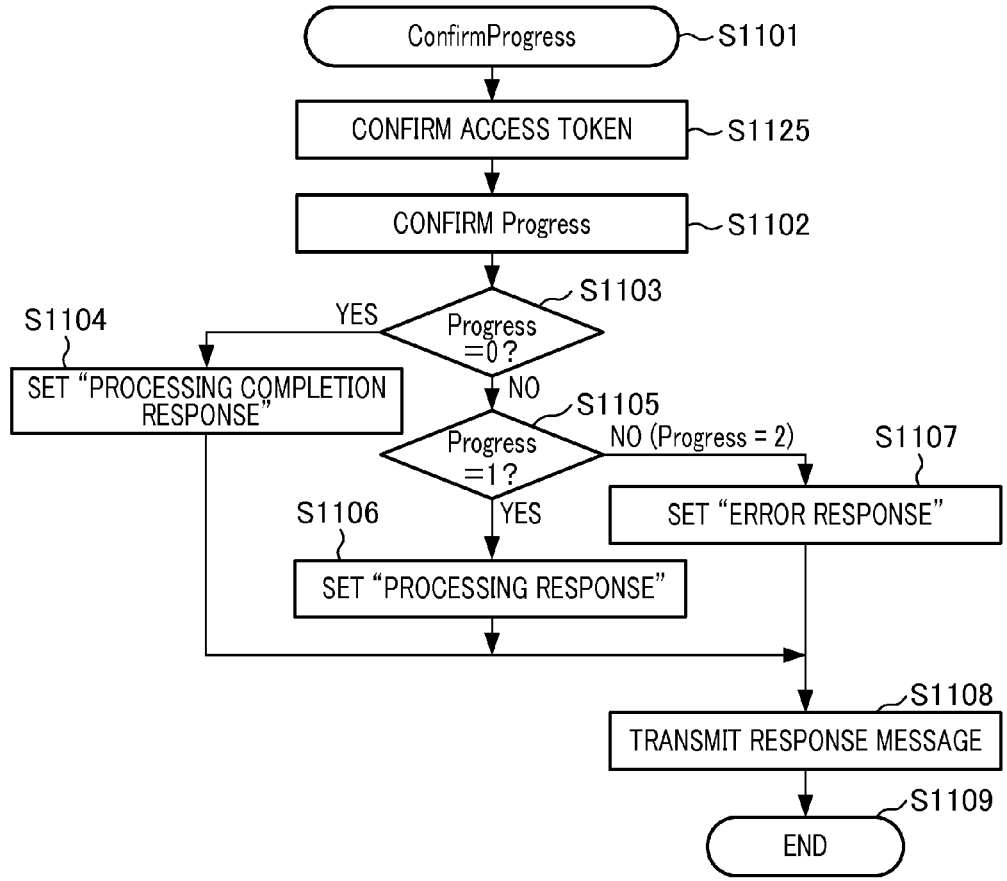
FIGS. 11A and 11B are diagrams illustrating examples of the flowchart of the processing performed by an image conversion APP.

When the proxy APP 143 calls the ConfirmProgress function in step S614 shown in FIG. 6, the image conversion APP 144 executes processing of the ConfirmProgress function shown in FIG. 11A. As shown in FIG. 11A, the image conversion APP 144 starts processing of the ConfirmProgress function (step S1101), and executes access token confirmation processing to be described below with reference to FIG. 15 (step S1125). At this time, the following information is passed as arguments of the processing (subroutine function):
　Service ID
　Printer ID issued by the cloud print APP 146
　Print job ID issued by the cloud print APP 146
　Access token for utilization of the image conversion APP 144

At this time, the HTTP GET request for the ConfirmProgress function includes a session ID and a sequence as query parameters. The sequence is any number created by the issuance source (in the present example, the proxy APP 143) of the GET request.

Next, the image conversion APP 144 confirms the progress state (Progress) in the session management database using the session ID included in query parameters as a search key (step S1102). Next, when the image conversion APP 144 determines that "0" representing "normal end" has been set to the progress state (Progress) (YES in step S1103), the process shifts to step S1104. On the other hand, when the image conversion APP 144 determines that "1" or "2" other than "0" has been set to the progress state (Progress) (NO in step S1103), the process shifts to step S1105.

In step S1104, the image conversion APP 144 sets the "processing completion response" to the response message to be included in the BODY of the response to the HTTP GET request, and the process shifts to step S1108. In step S1105, the image conversion APP 144 confirms the progress state (Progress). At this time, when the image conversion APP 144 determines that "1" representing "processing" is set to the progress state (Progress), the process shifts to step S1106, whereas when the image conversion APP 144 determines that "2" other than "1" is set to the progress state (Progress), the process shifts to step S1107.

In step S1106, the image conversion APP 144 sets the "processing response" to the response message to be included in the BODY of the response to the HTTP GET request, and the process shifts to step S1108. In step S1107, the image conversion APP 144 sets the "error response" to the response message to be included in the BODY of the response to the HTTP GET request, and the process shifts to step S1108.

In step S1108, the image conversion APP 144 transmits the response message to the issuance source (in the present example, the proxy APP 143) of the GET request, and ends processing of the ConfirmProgress function (step S1109).

Here, a detailed description will be given of "processing completion response", "processing response", and "error response". Each of these responses is the result of computation using the sequence included in the query parameters for the GET request in step S1101, and is constituted by, for example, character string information in which the following information is converted into a character string:
　"Processing completion response"=sequence
　"Processing response"=sequence+1
　"Error response"=sequence+2

As described above, the image conversion APP 144 uses generally incomprehensible character string information instead of visible information defined by XML or the like as the response to the HTTP GET request. In this manner, a malfunction or a fraudulent control caused by an unauthorized access to the Web service API may be prevented. The configuration for preventing such an unauthorized access is not limited to this example. More complex computation such as hashing or the like may also be combined. When the proxy APP 143 calls the JobCompleted function in step S803 shown in FIG. 8, the image conversion APP 144 executes processing of the JobCompleted function shown in FIG. 11B.

Figure 11B:
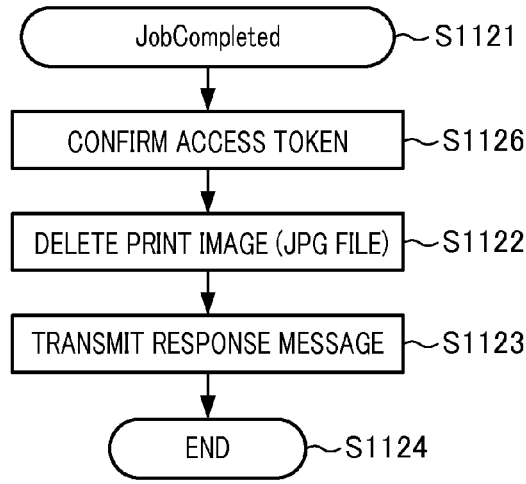

As shown in FIG. 11B, when the image conversion APP 144 starts processing of the JobCompleted function (step S1121), the image conversion APP 144 executes access token confirmation processing to be described below with reference to FIG. 15 (step S1126). At this time, the following information is passed as arguments of the processing (subroutine function):

Service ID
Printer ID issued by the cloud print APP 146
Print job ID issued by the cloud print APP 146
Access token for utilization of the image conversion APP 144

Then, the print image (JPEG file) is deleted (step S1122), and the process shifts to step S1123.

In step S1123, the image conversion APP 144 sets "SUCCESS" representing the fact that the function has been normally ended to the response message to be included in the BODY of the response to the HTTP POST request. In step S1123, the image conversion APP 144 transmits the response message to the issuance source (in the present example, the proxy APP 143) of the POST request. Then, the image conversion APP 144 ends processing of the JobCompleted function (step S1124).

Next, a description will be given of processing for the Web service API to be exported by the image conversion APP 144 with reference to FIG. 12. FIG. 12 is a diagram illustrating an example of the flowchart of processing of the CreatePrintJobResult function.

The SSL-encrypted HTTPS POST method is utilized for the CreatePrintJobResult function. A program relating to these flowcharts is embedded in the PC 5, stored in the HDD 202, read into the RAM 201, and executed by the CPU 204.

Figure 12:
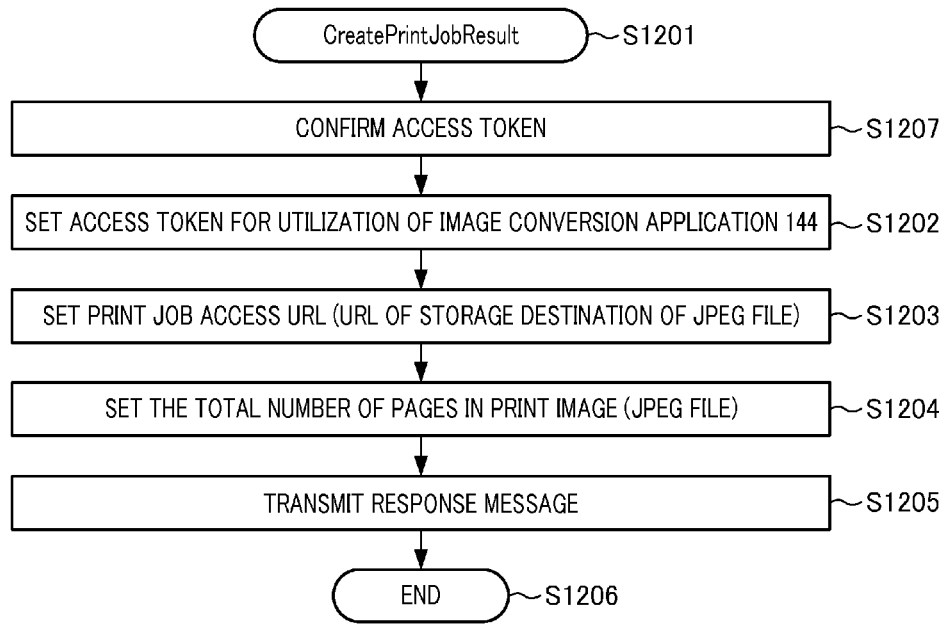
FIG. 12 is a diagram illustrating an example of the flowchart of the processing performed by an image conversion APP.

When the proxy APP 143 calls the CreatePrintJobResult function in step S701 shown in FIG. 7, the image conversion APP 144 executes processing of the CreatePrintJobResult function shown in FIG. 12. As shown in FIG. 12, the image conversion APP 144 starts processing of the CreatePrintJobResult function (step S1201), and executes access token confirmation processing to be described below with reference to FIG. 15 (step S1207). At this time, the following information is passed as arguments of the processing (subroutine function):

Service ID
Printer ID issued by the cloud print APP 146
Print job ID issued by the cloud print APP 146
Access token for utilization of the image conversion APP 144

Next, the image conversion APP 144 sets an access token for utilization of the image conversion APP 144 to the response message to be included in the BODY of the response to the HTTP POST request (step S1202), and the process shifts to step S1203.

In step S1203, the image conversion APP 144 sets the print job access URL (URL of the storage destination of a JPEG file) to the response message to be included in the BODY of the response to the POST request, and the process shifts to step S1204. In step S1204, the image conversion APP 144 sets the total number of pages in the print image (JPEG file) to the response message to be included in the BODY of the response to the POST request, and the process shifts to step S1205. In step S1205, the image conversion APP 144 transmits the response message to the issuance source (in the present example, the proxy APP 143) of the POST request, and ends processing of the CreatePrintJobResult function (step S1206).

Figure 13A:
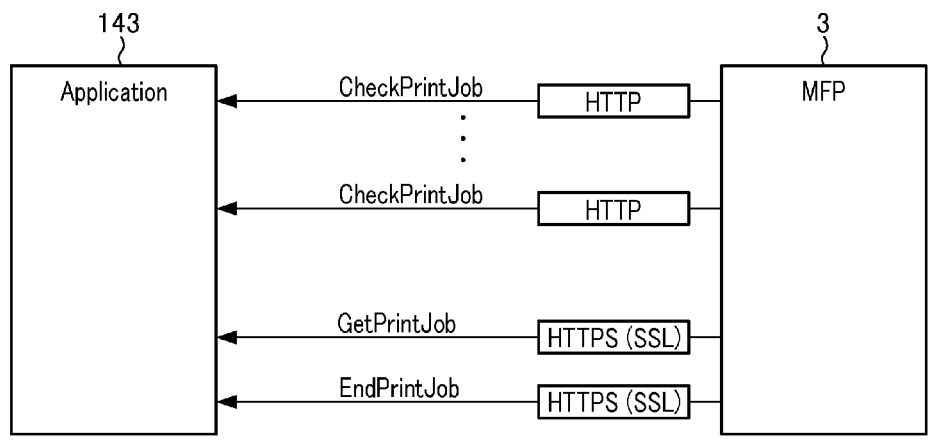
FIGS. 13A and 13B are diagrams illustrating an example of a calling sequence.
Figure 13B:
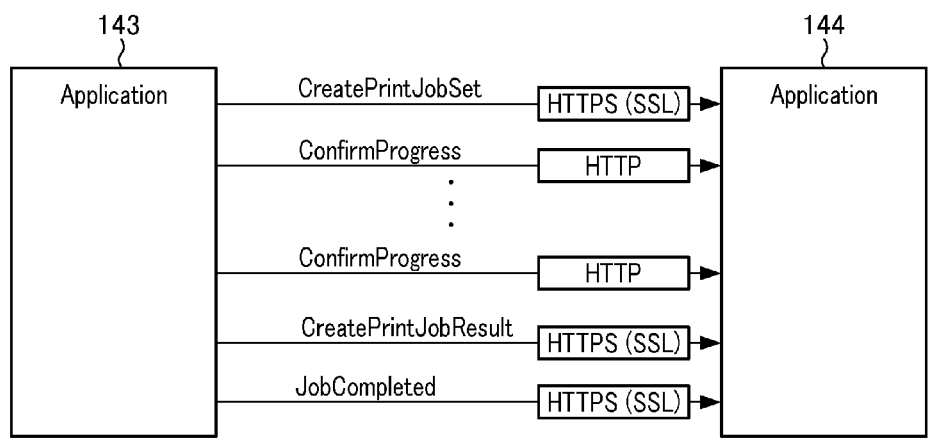

FIGS. 13A and 13B are diagrams illustrating an example of the calling sequence of the Web service API. FIG. 13A is a diagram illustrating an example of a calling sequence between the proxy APP 143 and the MFP 3. FIG. 13B is a diagram illustrating an example of a calling sequence between the proxy APP 143 and the image conversion APP 144.

As shown in FIG. 13A, between the proxy APP 143 and the MFP 3, the MFP 3 calls the Web service API being exported by the proxy APP 143. In other words, the Web service API being exported by the proxy APP 143 is called in the order of the CheckPrintJob function, the GetPrintJob function, and the EndPrintJob function.

Here, the unencrypted HTTP GET method is utilized for the CheckPrintJob function (polling processing only) and the SSL-encrypted HTTPS GET method is utilized for the functions other than the CheckPrintJob function. As described above, the unencrypted HTTP method is utilized for polling for only confirming the presence/absence of a print job, resulting in a reduction of the time required for polling. Consequently, a peripheral device control system having excellent user operability can be realized. In addition, the load placing on polling can be reduced, and thus, unnecessary configuration for accommodating such load can be reduced. Consequently, a system can be readily built and firmware for a printer and an MFP can be readily implemented, resulting in a reduction in development costs.

As shown in FIG. 13B, between the proxy APP 143 and the image conversion APP 144, the proxy APP 143 calls the Web service API being exported by the image conversion APP 144. In other words, the Web service API being exported by the proxy APP 143 is called in the order of the CreatePrintJobSet function, the ConfirmProgress function, the CreatePrintJobResult function, and the JobCompleted function.

Here, the unencrypted HTTP GET method is utilized for the ConfirmProgress function (polling processing only) and the SSL-encrypted HTTPS POST method is utilized for the functions other than the ConfirmProgress function.

As described above, the unencrypted HTTP method is utilized for polling for confirming only the progress state of processing, resulting in a reduction of the time required for polling. Consequently, a peripheral device control system having excellent user operability can be realized. In addition, the load placing on polling can be reduced, and thus, unnecessary configuration for accommodating such load can be reduced. Consequently, a system can be readily built and application can be readily implemented, resulting in a reduction in development costs.

Figure 14:
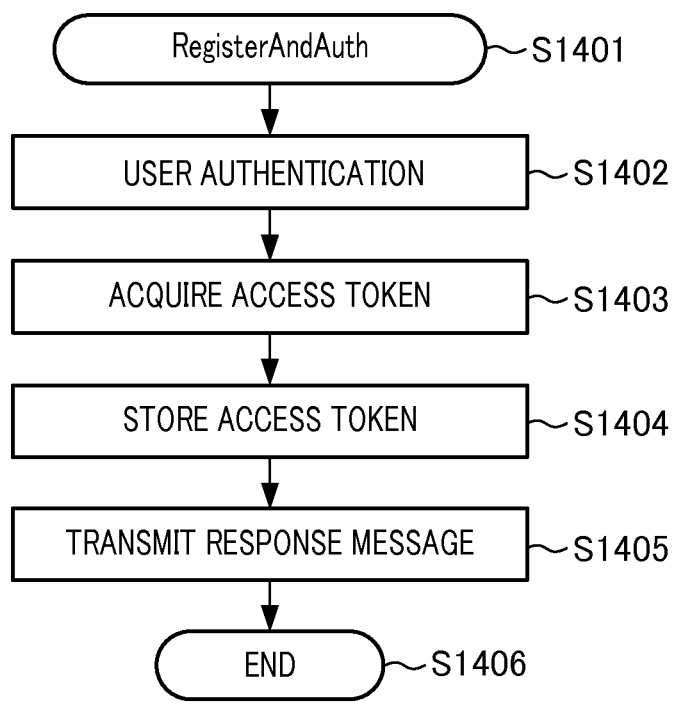
FIG. 14 is a diagram illustrating an example of the flowchart of the processing performed by an image conversion APP.

Next, a description will be given of processing for the Web service API to be exported by the image conversion APP 144 with reference to FIG. 14. FIG. 14 is a diagram illustrating an example of the flowchart of processing of the RegisterAndAuth function. The SSL-encrypted HTTPS POST method is utilized for the RegisterAndAuth function. A program relating to these flowcharts is embedded in the PC 5, stored in the HDD 202, read into the RAM 201, and executed by the CPU 204.

In FIG. 14, processing relating to an error case is omitted and only a normal case is shown. When the proxy APP 143 calls the RegisterAndAuth function in step S622 shown in FIG. 6, the CPU 204 of the image conversion APP 144 executes processing of the RegisterAndAuth function shown in FIG. 14. In step S1401, the image conversion APP 144 starts processing of the RegisterAndAuth function.

In step S1402, the image conversion APP 144 receives pre-processing information including input parameters from the proxy APP 143. The image conversion APP 144 performs user authentication by using the "user ID utilizing the image conversion APP 144" and the "user password utilizing the image conversion APP 144" as input parameters. Here, the image conversion APP 144 calls the user authentication function, which is one of the Web service API to be exported by the authentication APP 148, using the input parameters to thereby perform user authentication. The HDD 202 of the authentication APP 148 functions as a holding unit that holds user authentication information, and the CPU 204 of the authentication APP 148 performs user authentication when a user is present.

For example, when user authentication is performed for the first time, no user exists on the authentication APP 148. Also, no user may exist if the aforementioned input parameters are old due to the storage capacity of the HDD 202 functioning as a storage unit. Under the circumstances, the image conversion APP 144 fails user authentication in step S1402. When the user authentication has failed, the image conversion APP 144 uses the "administrator ID utilizing the authentication APP 148" and the "administrator password utilizing the authentication APP 148" included in the input parameters received from the proxy APP 143. Here, the image conversion APP 144 logs in by calling the log-in function which is one of the Web service API to be exported by the authentication APP 148.

After log-in, the image conversion APP 144 performs new user registration using the "user ID utilizing the image conversion APP 144" and the "user password utilizing the image conversion APP 144". Here, the image conversion APP 144 calls the user registration function which is one of the Web service API to be exported by the authentication APP 148. The image conversion APP 144 performs user authentication after new user registration or at the same time of registration processing. When the user authentication has succeeded, the CPU 204 of the image conversion APP 144 calls the access token generation function which is one of the Web service API to be exported by the authentication APP 148. In this manner, the CPU 204 of the image conversion APP 144 acquires an access token for utilization of the image conversion APP 144 (step S1403). The image conversion APP 144 stores the access token for utilization of the image conversion APP 144 as the first access token in the session management database of the HDD 202 (step S1404). In other words, the CPU 204 of the image conversion APP 144 functions as an acquisition unit that acquires the first access token from the authentication APP 148 by transmitting the authentication request to the authentication APP 148. Also, the session management database functions as a storage unit and stores the following information:

[Session Management Database]
  Search key: value generated by the combination of the service ID, the printer ID issued by the cloud print APP 146, and the print job ID issued by the cloud print APP 146
  Access token for utilization of the image conversion APP 144

In step S1405, the image conversion APP 144 creates a response message to be included in the BODY of the response to the HTTP POST request. More specifically, the image conversion APP 144 sets "SUCCESS" representing the fact that the RegisterAndAuth function has been successful and thus has been normally ended and the access token for utilization of the image conversion APP 144 acquired in step S1403 to the response message. Then, the image conversion APP 144 transmits the response message to the issuance source (in the present example, the proxy APP 143) of the POST request (step S1405). In step S1406, the image conversion APP 144 ends processing of the RegisterAndAuth function.

Figure 15:
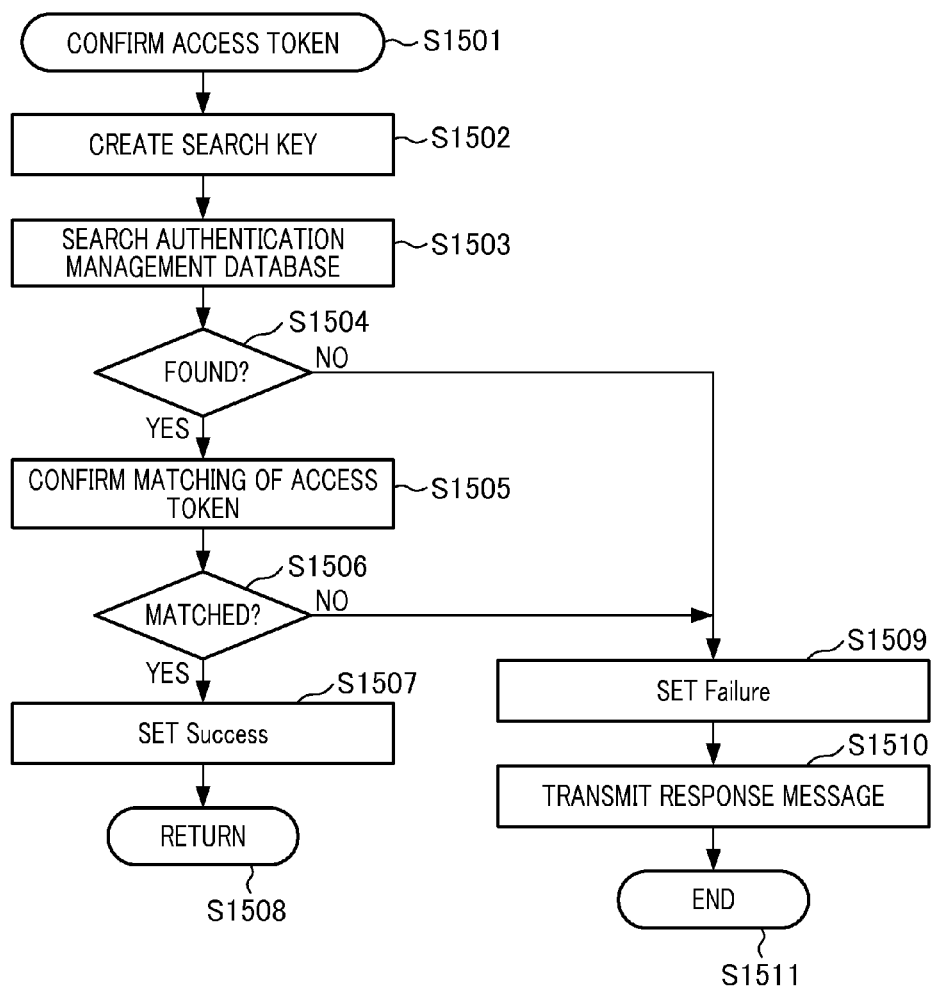
FIG. 15 is a diagram illustrating an example of the flowchart of the processing performed by an image conversion APP.

FIG. 15 is a diagram illustrating an example of the flowchart of access token confirmation processing performed by the image conversion APP 144. A program relating to these flowcharts is embedded in the PC 5, stored in the HDD 202, read into the RAM 201, and executed by the CPU 204.

Access token confirmation processing is the subroutine function in the image conversion APP 144, and the following information is passed as arguments of the subroutine function:
  Service ID
  Printer ID issued by the cloud print APP 146
  Print job ID issued by the cloud print APP 146
  Access token for utilization of the image conversion APP 144

In step S1018 shown in FIG. 10, step S1125 shown in FIG. 11A, step S1126 shown in FIG. 11B, and step S1207 shown in FIG. 12, the image conversion APP 144 executes access token confirmation processing. As shown in FIG. 15, the image conversion APP 144 starts access token confirmation processing in step S1501. The image conversion APP 144 creates a search key using the combination of the service ID, the printer ID issued by the cloud print APP 146, and the print job ID issued by the cloud print APP 146 (step S1502). In step S1503, the image conversion APP 144 searches the session management database using the search key.

When the image conversion APP 144 finds information associated with the search key in the session management database in step S1504, the process shifts to step S1505, whereas when the image conversion APP 144 does not find information, the process shifts to step S1509. The CPU 204 of the image conversion APP 144 compares whether or not the access token for utilization of the image conversion APP 144 (the second access token) matches the access token stored in the session management database. In other words, the CPU 204 of the image conversion APP 144 functions as a comparison unit that compares the first access token with the second access token. When the image conversion APP 144 determines that both access tokens are matched in step S1506, the process advances to step S1507, whereas when the image conversion APP 144 determines that both access tokens are not matched, the process advances to step S1509.

In step S1507, the image conversion APP 144 sets "SUCCESS" representing success to a return value. Then, the image conversion APP 144 returns to the caller of the subroutine function (step S1508). In step S1509, the image conversion APP 144 sets "FAILURE" representing failure to a return value. Then, the image conversion APP 144 creates a response message to the caller of the subroutine function, i.e., the HTTP POST request for the Web service API to be exported by the image conversion APP 144. Then, the CPU 204 of the image conversion APP 144 sets "FAILURE" representing the fact that the API has been successful and ended in failure to the response message included in the BODY of the response and stops processing (step S1509). Then, the image conversion APP 144 transmits the response message to the issuance source (in the present example, the proxy APP 143) of the POST request (step S1510). Then, the image conversion APP 144 ends processing of the subroutine function and the API (step S1511). In other words, the CPU 204 of the image conversion APP 144 functions as a processing execution unit that executes processing when it is determined that the first access token matches the second access token but stops processing when it is determined that both access tokens are not matched.

In step S1505, the image conversion APP 144 performs comparison processing. More specifically, the image conversion APP 144 compares whether or not the access token for utilization of the image conversion APP 144, which has been passed as an argument of the subroutine function, matches the access token for utilization of the image conversion APP 144, which is stored in the session management database. Based on the result of comparison whether or not both access tokens are matched, the image conversion APP 144 determines the validity of the access token without utilizing the access token validity confirmation function to be exported by the authentication APP 148. Thus, the image conversion APP 144 does not need to call the access token validity confirmation function of the Web service API to be exported by the authentication APP 148 each time the proxy APP 143 calls the image conversion APP 144, resulting in an improvement in performance.

The scale of the system for the authentication APP 148 can be reduced, resulting in increased simplicity of the system structure. In this manner, operational costs can also be reduced. Furthermore, the present embodiment is effective against a malicious attack by means of a spoofing program spoofing the proxy APP 143 serving as an upstream service. Even when a malicious attack such as an access from a spoofing program is made, a malfunction and information leakage caused thereby can also be prevented.

Furthermore, when the proxy APP 143 serving as an upstream service fails in operation, an access token attached to a print job may be associated with another print job caused by the malfunction. Even in such a case, the image conversion APP 144 can stop printing without processing the print job, and thus, error printing can also be prevented.

Furthermore, when no user exists on the authentication APP 143, the image conversion APP 144 performs new user registration. In this manner, the user himself/herself does not need to perform user registration, resulting in an improvement in usability.

The information processing system of the present embodiment can provide effects as follows. The information processing system of the present embodiment determines the validity of an access token based on the result of comparison processing for the access token for utilization of an image conversion APP. Thus, according to the information processing system of the present embodiment, multiple calls from a Web service API provided by a Web service application can be suppressed, resulting in improvement in performance. Also, the scale of the system for the Web service application can be reduced, resulting in the simplified system structure. The operational costs can also be reduced by the simplified system structure.

Also, according to the information processing system of the present embodiment, a malfunction and information leakage can be prevented even when a malicious attack is made by a spoofing program spoofing a Web service application. Even when the Web service application malfunctions, irrelevant processing or an irrelevant job (e.g., a print job for another person) is prevented from being incorrectly processed.

According to the information processing system of the present embodiment, there is no time consumption for confirmation processing for the progress state of image conversion processing based on polling and confirmation processing for the presence/absence of a print job based on polling, resulting in an improvement in user operability. Furthermore, trouble-free implementation of firmware for an inexpensive poor performance printer or multi-function peripheral such as the MFP 3 is ensured and there is no time consumption for each processing, resulting in an improvement in user operability.

According to the aforementioned embodiments, a description has been given based on the assumption that the information processing apparatus is a personal computer. However, the present invention is not limited thereto but is applicable to any information processing apparatus (terminal), which can be used in a similar manner as above, such as DVD players, games, set topboxes, Internet appliances, and the like.

In the aforementioned embodiments, an MFP has been exemplified as a peripheral device. However, a peripheral device may be any one of devices including a copier function, a facsimile function, a scanner function, a digital camera function, and a complex function thereof. In the aforementioned embodiments, the OS equivalent to Windows (registered trademark) is used. The present invention is not limited thereto but any type of OS can be used. In the aforementioned embodiments, Ethernet (registered trademark) is used as an exemplary configuration of the network 4. The present invention is not limited thereto but any other network configuration may also be used.

In the aforementioned embodiments, Ethernet (registered trademark) is used as an interface among the PCs 1, 2, 5, and 7 and the MFPs 3 and 103. However, the present invention is not limited thereto but any interface such as wireless LAN, IEEE 1394, Bluetooth (registered trademark), USB, and the like may also be used. The functions of various applications (firmware) or a part or all of processing of the flowchart may also be performed by dedicated hardware.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-263571 filed Dec. 1, 2011, which is hereby incorporated by reference herein in its entirety.

What is claimed is:

1. A method for controlling an information processing system, wherein the information processing system comprises a relay service device that performs relay processing related to a service provided from a print application to a user via a network, an intermediate service device that communicates with the relay service device and performs relation processing related to the service, and an authentication service device that receives an authentication request from the intermediate service device and performs authentication processing, the method comprising:

transmitting, by the relay service device, an authentication request to the intermediate service device;

transmitting, by the intermediate service device, the authentication request from the relay service device to the authentication service device;

acquiring, by the intermediate service device, a first access token from the authentication service device in response to the authentication request being successfully authenticated;

storing, by the intermediate service device, the first access token;

comparing, by the intermediate service device, the stored first access token with a second access token included in an execution request, the execution request comprising a request for performing image format conversion processing for a printing service;

executing, by the intermediate service device, the image format conversion processing if it is determined in the comparing that the first access token matches the second access token included in the execution request; and transmitting, by the intermediate service device, a response relating to the image format conversion processing.

2. The method according to claim 1, wherein the authentication request that is transmitted to the intermediate service device includes user authentication information and authentication information about the relay service device, and wherein the method further comprises registering, by the intermediate service device, the user authentication information in the authentication service device using the authentication information about the relay service device if the authentication service device has not successfully authenticated the authentication request using the user authentication information.

3. The method according to claim 2, further comprising holding, by the authentication service device, the user authentication information, wherein, if the authentication service holds authentication information corresponding to the user authentication information, the intermediate service device acquires in the acquiring the first access token issued by the authentication service device.

4. The method according to claim 1, wherein the image format conversion processing comprises converting a PDF file received from the relay service device into a JPEG file.

5. A non-transitory storage medium on which is stored a computer program for making a computer execute a method for controlling an intermediate service device that communicates with a relay service device that performs relay processing related to a service provided from a print application to a user via a network and makes an authentication request to an authentication service device, the method comprising:

receiving an authentication request from the relay service device;

transmitting the authentication request to the authentication service device;

acquiring a first access token from the authentication service device in response to the authentication request being successfully authenticated;

storing the first access token;

comparing, by the intermediate service device, the stored first access token with a second access token included in an execution request, the execution request comprising a request for performing image format conversion processing for a printing service;

executing, by the intermediate service device, the image format conversion processing if it is determined in the comparing that the first access token matches the second access token included in the execution request; and transmitting, by the intermediate service device, a response relating to the image format conversion processing.

\* \* \* \* \*